United States Patent
Yasutomi et al.

(10) Patent No.: US 7,724,394 B2
(45) Date of Patent: May 25, 2010

(54) IMAGE FORMING APPARATUS AND IMAGE FORMING METHOD USING PSEUDO HALF TONE PROCESSING WITH DIFFERENT RESOLUTIONS

(75) Inventors: Kei Yasutomi, Kanagawa (JP); Jun Yura, Kanagawa (JP); Hideki Kosugi, Kanagawa (JP); Hirokatsu Suzuki, Kanagawa (JP); Kohichi Katoh, Kanagawa (JP); Hiroshi Nakai, Kanagawa (JP); Ichiro Kadota, Tokyo (JP); Kazumi Suzuki, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 1330 days.

(21) Appl. No.: 10/960,049

(22) Filed: Oct. 8, 2004

(65) Prior Publication Data

US 2005/0088697 A1 Apr. 28, 2005

(30) Foreign Application Priority Data

Oct. 10, 2003 (JP) ............................. 2003-351444

(51) Int. Cl.
*G06K 15/00* (2006.01)
*H04N 1/405* (2006.01)
*G06F 15/00* (2006.01)
*G06K 1/00* (2006.01)
*G06K 15/02* (2006.01)

(52) U.S. Cl. ...................... 358/3.06; 358/1.2
(58) Field of Classification Search .................. 358/3.1, 358/3.14, 3.21, 3.22, 3.24, 3.01
See application file for complete search history.

(56) References Cited

U.S. PATENT DOCUMENTS

| | | | |
|---|---|---|---|
| 5,244,765 A | 9/1993 | Katoh et al. | |
| 5,368,972 A | 11/1994 | Yamashita et al. | |
| 5,418,618 A * | 5/1995 | Kagawa et al. | 358/3.23 |
| 5,474,869 A | 12/1995 | Tomita et al. | |
| 5,708,949 A | 1/1998 | Kasahara et al. | |

(Continued)

FOREIGN PATENT DOCUMENTS

JP 7-242019 9/1995

(Continued)

OTHER PUBLICATIONS

U.S. Appl. No. 11/181,887, filed Jul. 15, 2005, Kadota et al.

(Continued)

*Primary Examiner*—Douglas Q Tran
(74) *Attorney, Agent, or Firm*—Oblon, Spivak, McClelland, Maier & Neustadt, L.L.P.

(57) ABSTRACT

An image forming apparatus includes a pseudo half tone processing unit that performs a pseudo half tone process on input image data to generate output image data. An exposure unit executes light modulation of a plurality of light emitting sources based on the output image data. The exposure unit performs writing in such a way that different numbers of light emitting sources are used when writing a character/line image and a picture image or a graphics image. The pseudo half tone processing unit performs pseudo half tone processes with different resolutions on a character/line image and a picture image or a graphics image based on the numbers of the light emitting sources to be used for the writing by the exposure unit.

27 Claims, 18 Drawing Sheets

U.S. PATENT DOCUMENTS

| | | | |
|---|---|---|---|
| 5,740,494 A | 4/1998 | Shoji et al. | |
| 5,747,413 A | 5/1998 | Amano et al. | |
| 5,808,656 A * | 9/1998 | Goldmann | 347/238 |
| 5,869,422 A | 2/1999 | Kazumi et al. | |
| 5,916,841 A | 6/1999 | Amano et al. | |
| 5,920,844 A | 7/1999 | Hotta et al. | |
| 5,923,930 A | 7/1999 | Tsukamoto et al. | |
| 5,937,228 A | 8/1999 | Shoji et al. | |
| 5,970,280 A | 10/1999 | Suzuki et al. | |
| 5,999,773 A | 12/1999 | Yasutomi et al. | |
| 6,015,770 A | 1/2000 | Amano et al. | |
| 6,030,736 A | 2/2000 | Ikegami et al. | |
| 6,066,429 A | 5/2000 | Katoh | |
| 6,096,683 A | 8/2000 | Amano et al. | |
| 6,115,576 A | 9/2000 | Nakano et al. | |
| 6,177,383 B1 | 1/2001 | Amano et al. | |
| 6,347,212 B1 | 2/2002 | Kosugi et al. | |
| 6,366,751 B1 | 4/2002 | Shakuto et al. | |
| 6,468,706 B2 | 10/2002 | Matsuda et al. | |
| 6,498,617 B1 * | 12/2002 | Ishida et al. | 347/252 |
| 6,544,704 B1 | 4/2003 | Matsuda et al. | |
| 6,559,421 B1 | 5/2003 | Yura et al. | |
| 6,593,048 B2 | 7/2003 | Sasaki et al. | |
| 6,597,885 B2 | 7/2003 | Kai et al. | |
| 6,613,715 B2 | 9/2003 | Kutami et al. | |
| 6,625,409 B2 | 9/2003 | Shakuto et al. | |
| 6,631,253 B2 | 10/2003 | Nakafuji et al. | |
| 6,636,718 B2 | 10/2003 | Yura et al. | |
| 6,646,227 B2 | 11/2003 | Yura et al. | |
| 6,654,579 B2 | 11/2003 | Shakuto et al. | |
| 6,658,227 B2 | 12/2003 | Oyama et al. | |
| 6,667,141 B2 | 12/2003 | Iwamoto et al. | |
| 6,686,946 B2 | 2/2004 | Masuda et al. | |
| 6,699,632 B2 | 3/2004 | Higuchi et al. | |
| 6,721,532 B2 | 4/2004 | Kosugi et al. | |
| 6,734,138 B2 | 5/2004 | Suzuki et al. | |
| 6,757,509 B2 | 6/2004 | Shoji et al. | |
| 6,757,512 B2 | 6/2004 | Miyawaki et al. | |
| 6,770,592 B2 | 8/2004 | Suzuki et al. | |
| 6,778,805 B2 | 8/2004 | Kai et al. | |
| 2001/0051065 A1 * | 12/2001 | Togami | 400/76 |
| 2002/0039698 A1 | 4/2002 | Sasaki et al. | |
| 2002/0081128 A1 | 6/2002 | Shakuto et al. | |
| 2002/0081513 A1 | 6/2002 | Higuchi et al. | |
| 2002/0090229 A1 | 7/2002 | Shakuto et al. | |
| 2002/0159797 A1 | 10/2002 | Matsuda et al. | |
| 2003/0016971 A1 | 1/2003 | Kikuchi et al. | |
| 2003/0073021 A1 | 4/2003 | Sasaki et al. | |
| 2003/0074260 A1 | 4/2003 | Sugiyama et al. | |
| 2003/0099479 A1 | 5/2003 | Nakafuji et al. | |
| 2003/0103788 A1 | 6/2003 | Yura et al. | |
| 2003/0192869 A1 | 10/2003 | Yura et al. | |
| 2003/0210930 A1 | 11/2003 | Nakai et al. | |
| 2003/0215264 A1 | 11/2003 | Yasutomi et al. | |
| 2003/0218665 A1 | 11/2003 | Yasutomi et al. | |
| 2004/0022552 A1 | 2/2004 | Yura et al. | |
| 2004/0058260 A1 | 3/2004 | Katoh et al | |
| 2004/0086293 A1 | 5/2004 | Atsushi et al. | |
| 2004/0096244 A1 | 5/2004 | Kadota et al. | |
| 2004/0111888 A1 | 6/2004 | Yura et al. | |
| 2004/0126148 A1 | 7/2004 | Iwai et al. | |

FOREIGN PATENT DOCUMENTS

| | | |
|---|---|---|
| JP | 9-282471 | 10/1997 |
| JP | 10-100481 | 4/1998 |
| JP | 11-6971 | 1/1999 |
| JP | 11-191842 | 7/1999 |
| JP | 2002-23087 | 1/2002 |
| JP | 2002-251023 | 9/2002 |
| JP | 3368143 | 11/2002 |

OTHER PUBLICATIONS

U.S. Appl. No. 10/769,855, filed Feb. 3, 2004, Kazuhiko Watanabe, et al.
U.S. Appl. No. 10/625,521, filed Jul. 24, 2003, Hideki Kosugi, et al.
U.S. Appl. No. 09/708,659, filed Nov. 9, 2000, Nobutaka Takeuchi, et al.
U.S. Appl. No. 08/313,541, filed Sep. 27, 1994.
U.S. Appl. No. 08/105,774, filed Aug. 12, 1993.
U.S. Appl. No. 07/694,821, filed May 2, 1991.
U.S. Appl. No. 08/128,048, filed Sep. 27, 1993.
U.S. Appl. No. 07/691,348, filed Apr. 25, 1991.
U.S. Appl. No. 07/668,487, filed Mar. 13, 1991.

* cited by examiner

| IMAGE TYPE | | K | | C | |
|---|---|---|---|---|---|
| | | NUMBER OF LINES / ANGLE | RESOLUTION / QUANTIZATION NUMBER | NUMBER OF LINES / ANGLE | RESOLUTION / QUANTIZATION NUMBER |
| (1) CHARACTER/ LINE IMAGE | DOTS 283 LPI NO SCREEN ANGLE DIFFERENCE (ONLY PHASE DIFFERENCE) | 282.8 45.0 | 1200 2 | 282.8 45.0 | 1200 2 |
| (2) PICTURE IMAGE | LINES 192 LPI SCREEN ANGLE DIFFERENCE | 191.7 −63.4 | 600 4 | 191.7 63.4 | 600 4 |
| (3) GRAPHICS IMAGE | DOTS 200 LPI SCREEN ANGLE DIFFERENCE | 212.1 45.0 | 600 4 | 189.7 71.6 | 600 4 |

FIG. 4B

| M | | | Y | | |
|---|---|---|---|---|---|
| NUMBER OF LINES | RESOLUTION | QUANTIZATION NUMBER | NUMBER OF LINES | RESOLUTION | QUANTIZATION NUMBER |
| ANGLE | | | ANGLE | | |
| 282.8 | 1200 | 2 | 282.8 | 1200 | 2 |
| 45.0 | | | 45.0 | | |
| 191.7 | 600 | 4 | 191.7 | 600 | 4 |
| −26.6 | | | 26.5 | | |
| 189.7 | 600 | 4 | 200.0 | 24*24 | 4 |
| 18.4 | | | 45.0 | | |

WHEN CHARACTER/
LINE IMAGE IS OUTPUT

WHEN PICTURE IMAGE
OR GRAPHICS IMAGE
IS OUTPUT

FIG. 11
PICTURE IMAGE
(RESOLUTION 1200 (MAIN)
× 600 (SUB) DPI,
QUANTIZATION NUMBER
3 BITS)
CHARACTER/LINE IMAGE
(RESOLUTION 1200 DPI,
QUANTIZATION
NUMBER 2 BITS)
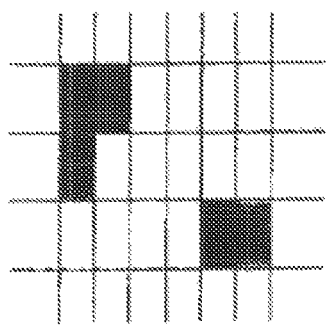
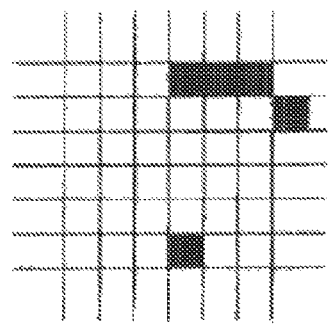
OUTPUT IMAGE RASTER DATA
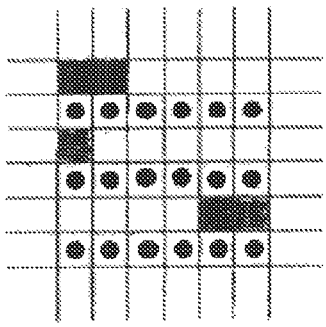
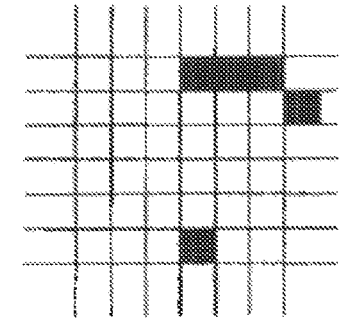
(LOWER 3-BIT DATA
IN 5 BITS PER PIXEL)
● IS DATA 0 OR SPECIAL VALUE
THAT DOES NOT CAUSE LD TO
EMIT LIGHT
(UPPER 2-BIT DATA
IN 5 BITS PER PIXEL)

FIG. 13
PICTURE IMAGE
(RESOLUTION 600 (MAIN)
× 1200 (SUB) DPI,
QUANTIZATION NUMBER
3 BITS)
CHARACTER/LINE IMAGE
(RESOLUTION 1200 DPI,
QUANTIZATION
NUMBER 2 BITS)
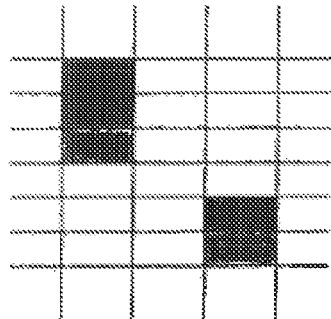
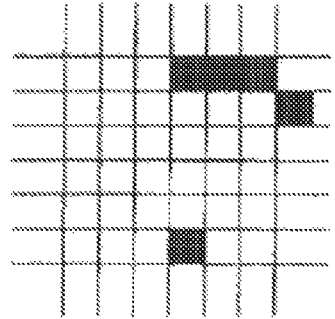
⇩ OUTPUT IMAGE RASTER DATA ⇩
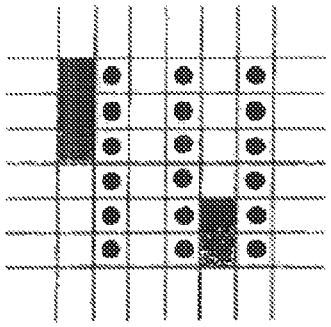
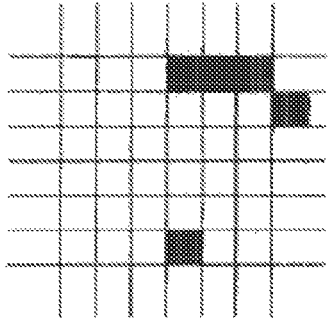
(LOWER 3-BIT DATA
IN 5 BITS PER PIXEL)
● IS DATA 0 OR SPECIAL VALUE
THAT DOES NOT CAUSE LD TO
EMIT LIGHT
(UPPER 2-BIT DATA
IN 5 BITS PER PIXEL)
FIG. 14
|   |   | * | 7 | 5 |
|---|---|---|---|---|
| 3 | 7 | 9 | 5 | 2 |
| 1 | 3 | 5 | 3 | 0 |

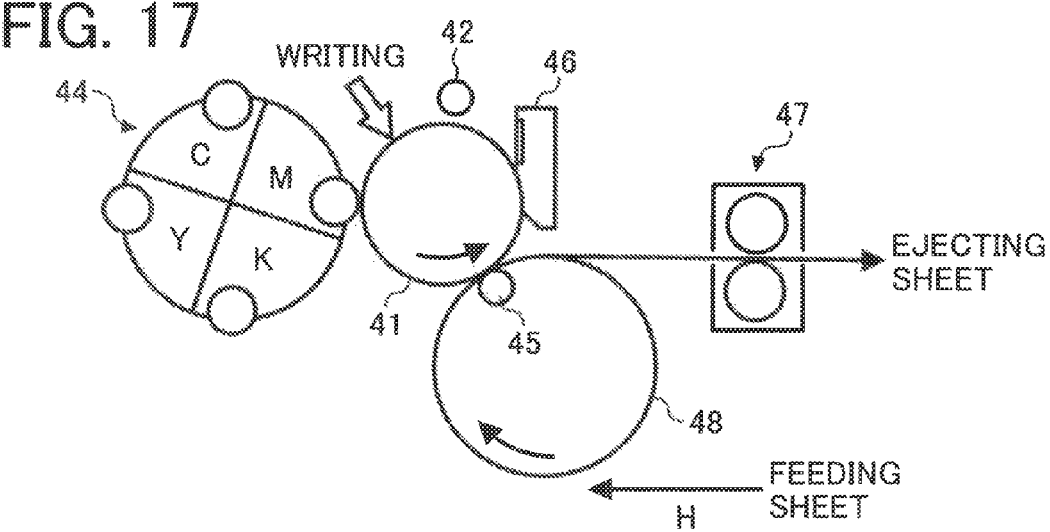
FIG. 17
BACKGROUND ART
FIG. 18
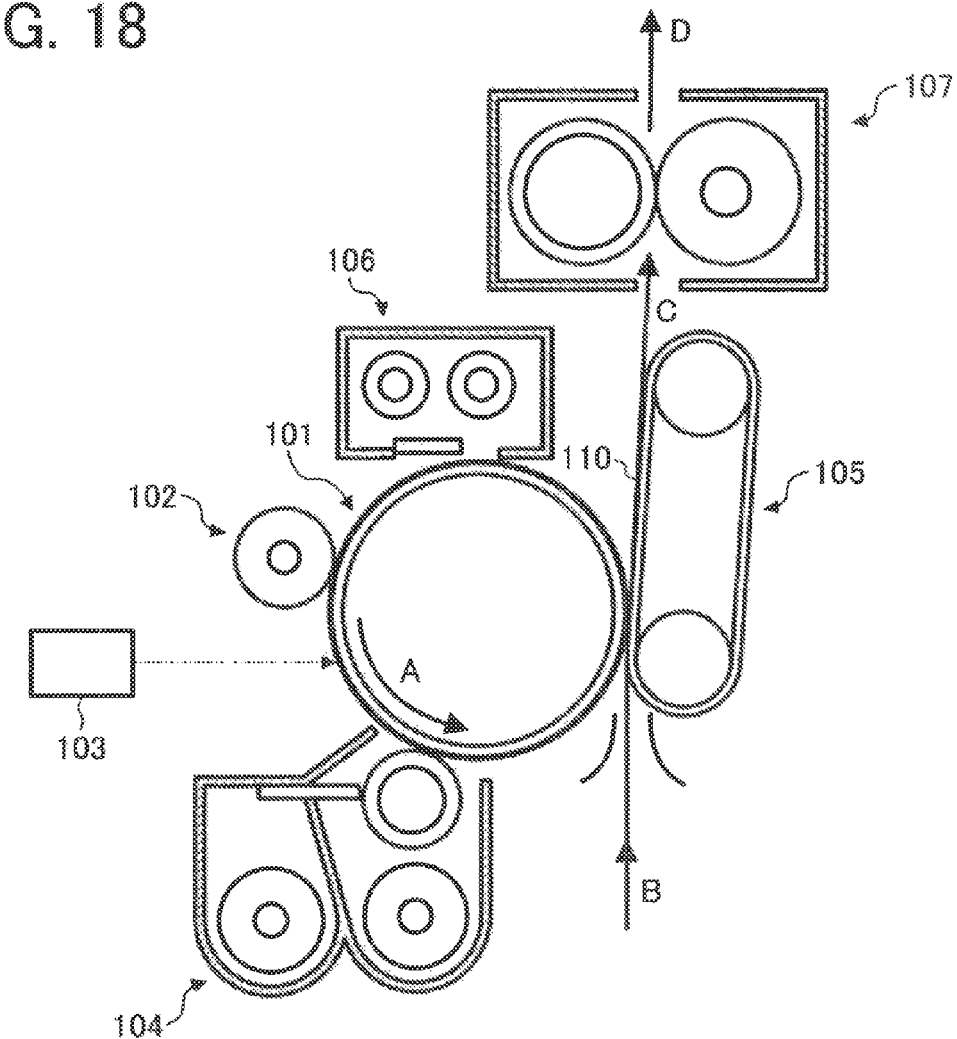

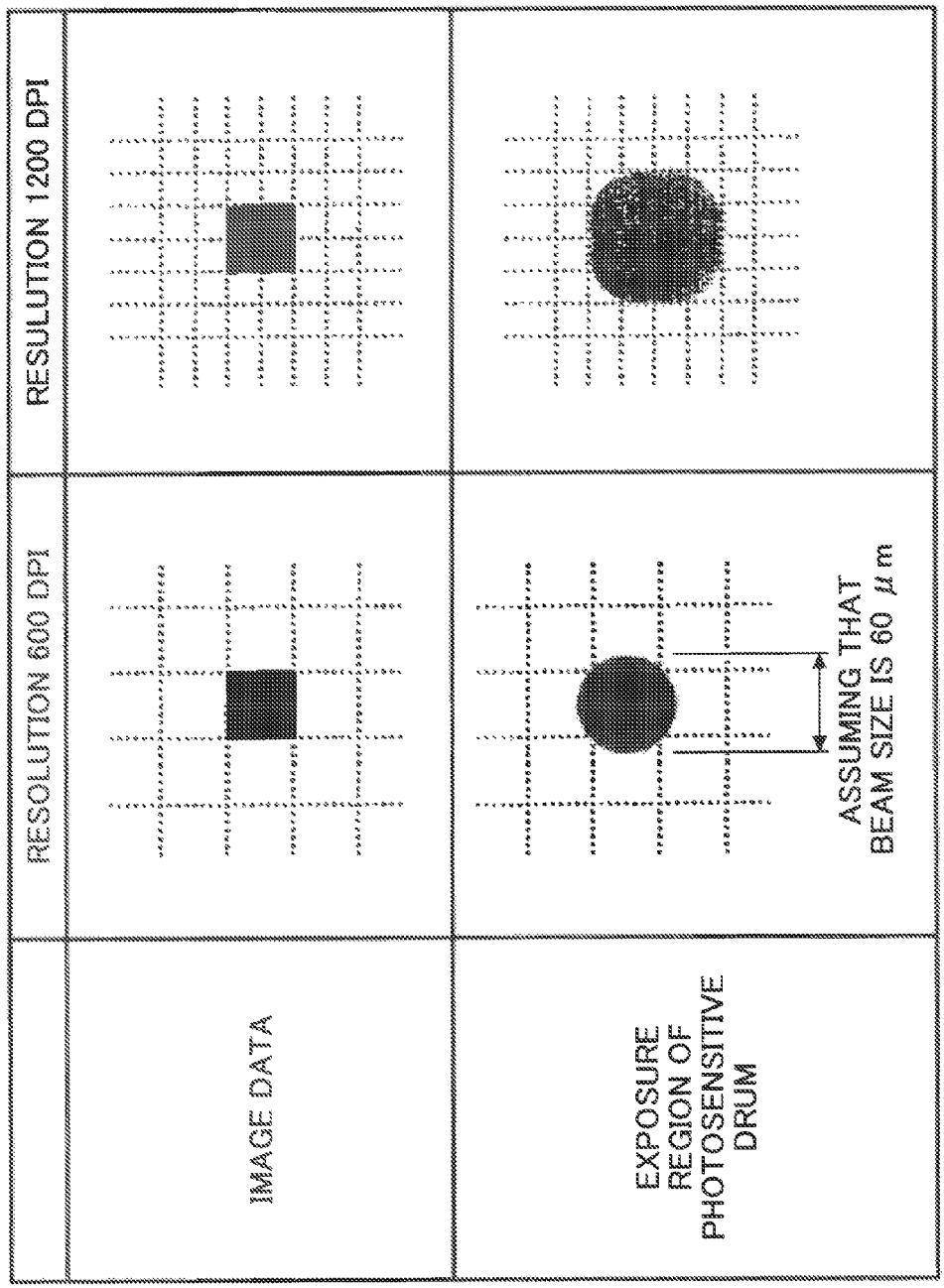

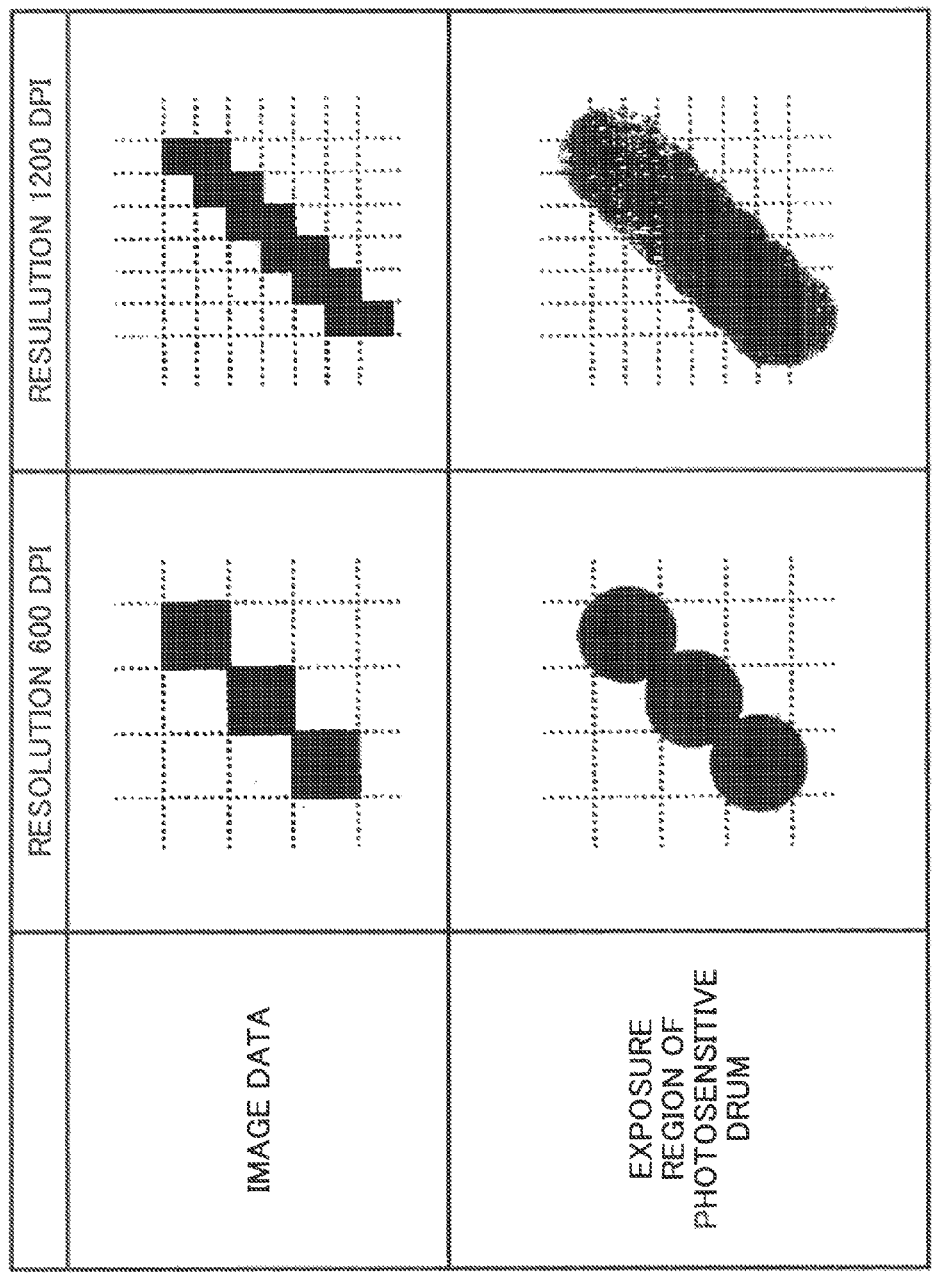

IMAGE FORMING APPARATUS AND IMAGE FORMING METHOD USING PSEUDO HALF TONE PROCESSING WITH DIFFERENT RESOLUTIONS

CROSS-REFERENCE TO RELATED APPLICATIONS

The present document incorporates by reference the entire contents of Japanese priority document, 2003-351444 filed in Japan on Oct. 10, 2003.

BACKGROUND OF THE INVENTION

1) Field of the Invention

The present invention relates to an image forming apparatus that uses an electrophotographic process, such as an electrostatic copier, a laser printer or a plain paper facsimile machine, and an image forming method for the apparatus. More particularly, the present invention relates to an image forming apparatus that is equipped with a multi-beam optical system having a plurality of light emitting sources (laser diodes or the like) in a writing unit and that performs a pseudo half tone process on input image data to generate output image data and performs writing by executing light modulation of the light emitting sources of the writing unit, and an image forming method for the apparatus.

2) Description of the Related Art

FIG. 18 is a schematic structural diagram of an imaging unit (printer unit) in a conventional image forming apparatus that functions on an electrophotographic process. The imaging unit includes a photosensitive drum 101 that has a photoconductor coated on the top surface of a conductor. The photosensitive drum 101 rotates in the direction of an arrow A. The imaging unit also includes a charging roller 102, an exposure unit 103, a developing unit 104, a transfer/feeding unit 105, and a cleaning unit 106 that are arranged around the photosensitive drum 101. The imaging unit also includes a fixing unit 107 at the downstream side of the transfer/feeding unit 105.

The image forming apparatus forms an image in the following manner:

1. The charging roller 102 charges a surface of the photosensitive drum 101 to a desired potential, 2. Optical writing is done on the charged top surface of the photosensitive drum 101 with a laser beam LB from the exposure unit (optical unit) 103 to form an electrostatic latent image corresponding to the desired image, 3. The electrostatic latent image formed on the surface of the photosensitive drum 101 is developed with a toner in the developing unit 104, thereby forming a toner image, 4. The transfer/feeding unit 105 transfers the toner image on the photosensitive drum 101 onto a recording sheet 110, such as paper, which is fed in the direction of an arrow B at a given timing by a sheet feeder, such as resist rollers (not shown), and feeds the recording sheet 110 in the direction of an arrow C, 5. The cleaning unit 106 cleans toners that are not transferred onto the recording sheet 110 and remains on the surface of the photosensitive drum 101, 6. The recording sheet 110 with the toner image is transported in the direction of the arrow C by the transfer/feeding unit 105 and fed to the fixing unit 107. The fixing unit 107 heats the recording sheet 110 to thereby fixing the toner image. After the toner image is fixed on the recording sheet 110, the recording sheet 110 is discharged in the direction of an arrow D.

As the photosensitive drum 101 rotates in the direction of the arrow A, subsequent desired image is formed on the recording sheet 110 by repeating the steps 1 to 6 mentioned above.

The exposure unit 103 in the electrophotographic process is generally designed to perform light modulation of a laser diode (LD) in association with an output image. The exposure unit 103 includes an LD that irradiates a laser beam onto the photosensitive drum 101 via a collimate lens, an aperture, a cylindrical lens, a polygon mirror, an f-θ lens, etc. (none of which are not shown).

The polygon mirror is a rotatable mirror with multiple surfaces. As the polygon mirror rotates, the laser beam LB scans on the top surface of the photosensitive drum 101 (main scanning).

As the photosensitive drum 101 rotates in a direction orthogonal to the scan direction of the laser beam LB by a photoconductor driving unit (sub scanning), it is possible to expose the top surface of the photosensitive drum 101 with the laser beam LB to two-dimensionally form an electrostatic latent image corresponding to the desired image on the top surface of the photosensitive drum 101.

FIG. 19 is an exemplary configuration of the conventional image forming apparatus.

The conventional image forming apparatus includes an image input unit 111 which is a scanner or the like. The scanner may be the one that is connectable to computers, or that is arranged in digital copying machines or image data reading units. The image input unit 111 sends image data, which may be read from an original or may be read from a recording medium, as input image data PDi to an image processing unit 112.

The image processing unit 112 performs various kinds of image processing, such as MTF filtering, gradation correction (γ conversion), and a pseudo half tone process, on the input image data in order in an MTF filtering unit 113, a gradation correcting (γ conversion) unit 114, and a pseudo half tone processing unit 115, and sends output image data PDo as a processing result to a video signal processing unit 117.

The video signal processing unit 117 converts the output image data PDo to an image signal PS, sends the image signal PS to the exposure unit 103 shown in FIG. 18, and drives the LD at a given timing. In an image forming apparatus equipped with a plurality of LDs, the video signal processing unit 117 distributes the image signal for the LDs to be used.

The individual units are connected to a Central Processing Unit (CPU) 121, a read only memory (ROM, program memory) 122, and a random access memory (RAM, data memory) 123, that constitute a microcomputer, and an operation unit 124 having operation keys and a display via a system bus 120, and are controlled by the CPU 121.

The image forming apparatus described above is a monochromatic electrophotographic image forming apparatus. As a full-color electrophotographic image forming apparatus, there is known a tandem type electrophotographic apparatus that has four sets of electrophotographic process units (equivalent to the individual units shown in FIG. 18) respectively corresponding to the individual colors of cyan (C), magenta (M), yellow (Y), and black (K).

In a tandem type full-color image forming apparatus, toner images of the colors C, M, Y, and K are transferred onto a belt-like intermediate transfer in an overlaid manner, then the toner images of the four colors are transferred onto a recording sheet, such as paper, at a time. The toner images on the recording sheet are heated and pressed by a fixing unit to be fixed on the recording sheet. The recording sheet is then ejected out of the apparatus.

There is know a direct transfer type full-color image forming apparatus that does not have an intermediate transfer unit and overlays toner images of individual colors of C, M, Y, and K on a recording sheet in order.

There is known a revolver type full-color image forming apparatus in which developers of the individual colors of C, M, Y, and K are rotatably supported with respect to a single photosensitive drum in such a way that the developers face the photosensitive drum in order.

Generally the image forming apparatuses are equipped with a multi-beam optical system that has a plurality of light emitting sources (laser diodes or the like) in a writing unit equivalent to the exposure unit 103. If higher resolution is required or if faster printing speed required, and if only one light emitting source is used, then the polygon mirror is required to be rotated more times. This causes an increase in the noise generated from the polygon mirror, an insufficient strength of the rotary shaft thereof, an increase in heat generated by the rotary shaft, and an enlargement of a driving power source.

Further, the frequency of a pixel clock should be increased at the same time, requiring the fabrication of an electronic circuit adapted for high-speed switching of the laser diode. When the drive frequency of an electronic circuit exceeds 50 Megahertz, however, it becomes difficult to stably operate the electronic circuit.

As a solution to those problems, there is known a multi-beam system having a plurality of light emitting sources. The multi-beam system simultaneously scans with laser beams emitted from the light emitting sources using the polygon mirror, thereby simultaneously forming plural lines of electrostatic latent images on a photoconductor, as disclosed in, for example, Japanese Patent Application Laid-open No. H7-242019.

Image data to be input to the image forming apparatus is multi-value data of 8 to 12 bits per pixel for a gradation image of a picture or the like. In an image forming apparatus (including an electrophotographic type) that forms an image on a sheet of paper (so-called hard copy), the number of gradations that can be expressed per pixel is substantially very small.

To overcome the problem, an image forming apparatus as a hard copying machine displays a half-tone image in a pseudo manner by improving the resolution to 600 dots per inch (dpi) or to 1200 dpi and modulating the image density with a plurality of pixels in terms of an area. The image processing that is performed in the process of converting the input image data to data of a pseudo half tone image is a pseudo half tone process.

Input image data can be classified into the following three types of images.

(1) Character/line image (2) Picture image (3) Graphics image

The character/line image of the type (1) has a characteristic that the shape reproducibility of a character/line is important whereas the color reproducibility and the gradation reproducibility are less significant. The picture image of the type (2) and the graphics image of the type (3) have the opposite characteristic such that the color reproducibility and the gradation reproducibility are more significant than the shape reproducibility.

Under such a circumstance, as a conventional technology, an electrophotographic apparatus described in, for example, Japanese Patent Application Laid-open No. H9-282471 employs a method of changing the number of lines in a pseudo half tone process in such a way that a screen process with 400 lines is performed for a character/line image and a contour and a screen process with 200 lines is performed for other images, such as a picture image.

The resolution of an electrophotographic image forming apparatus has a tendency of becoming greater. At present, the standard resolution is 600 dpi and there are many apparatuses that achieve the resolution of 1200 dpi.

In most of the apparatuses that achieve the resolution of 1200 dpi, the beam size of a laser beam to expose a photoconductor (the size of a spot that forms an area indicating $1/e^2$ of the peak amount of light) lies in a range of 50 to 80 micrometers. With the resolution of 1200 dpi, the length per pixel is 21.2 micrometers, which is significantly smaller than the beam size.

The beam size of the laser beam is determined by the wavelength of a laser, the focal distance of the optical system, and the aperture size, so that reducing the beam size alone causes a problem of enlarging the apparatus. This prevents the beam size from being made smaller actively.

Setting the resolution to 1200 dpi is advantageous in that jaggies (an oblique line or a periphery of a character having a jagged contour) in a character/line image can be eliminated and oblique lines or characters having a smooth contour can be reproduced. As a result, the differences between individual fonts can be discriminated, thus ensuring such printing as to make the differences between individual fonts discriminable even in a hard-copy image like an image formed on a sheet of paper.

However, the experiments conducted by the present inventor showed that increasing the resolution as large as 1200 dpi resulted in significant degrading of the gradation including a reduction in the reproducibility of highlighting. This has made it clear that a picture image or a graphics image for which the gradation reproducibility or the color reproducibility are considered significant suffer a reduction in image quality. This seems to have originated from increasing the resolution alone without reducing the beam size.

That is, for images undergone a pseudo half tone process with the same number of lines, an image with a higher resolution has a larger number of pixels to be written. However, the size of an area on a photoconductor to be actually exposed with a laser beam in association with one pixel is determined by the beam size of the laser beam, so that increasing the resolution increases the area of a region on the photoconductor to be exposed becomes larger unless the beam size becomes smaller. This seems to degrade the gradation including a reduction in the reproducibility of a highlighted region.

The description given above is explained in reference to FIG. 20. FIG. 20 depicts, as an example, an image with 200 lines per inch (lpi) as the number of lines and an area ratio of 11% (=1/9). With the resolution of 600 dpi, image data has ON data included at only one pixel in a region consisting of a total of nine pixels, three pixels in the main scanning direction and the sub scanning direction. While FIG. 20 depicts only a region of 3×3 pixels, an image having such a pattern repeated cyclically is formed. This image data is shown on the upper left side in FIG. 20.

When an image with 200 lpi and an area ratio of 11% is formed with a resolution of 1200 dpi, image data has ON data included at four pixels in a region consisting of 6×6 pixels or a total of 36 pixels, as shown on the upper right side in FIG. 20.

Here is an instance that exposure is done with a laser beam having a beam size of 60 (main scanning direction)×60 (sub scanning direction) micrometers with respect to such image data with both resolutions of 600 dpi and 1200 dpi. The reason why it is not easy to reduce the beam size according to the resolution has already been given above.

The lower side in FIG. 20 depicts the photoconductor being exposed corresponding to the image data. In practice, the photoconductor is exposed by turning on the laser diode while scanning the photoconductor in the main scanning direction with the laser beam, so that the exposure region moves in the main scanning direction. Accordingly, the exposure region becomes elongated in the main scanning direction. However, as the fact is not essential in the description below, it will not be explained.

While the beam size is the same for 600 dpi and 1200 dpi, the amount of light corresponding to one pixel differs between 600 dpi and 1200 dpi. Ideally, writing is done for 600 dpi with the amount of light four times the amount of light for 1200 dpi, but writing is done with the adequate amount of light for each resolution.

The lower left side in FIG. 20 depicts the exposed state on the photoconductor for 600 dpi, and the lower right side depicts the exposed state on the photoconductor for 1200 dpi. When writing is done with the same beam size for 600 dpi and 1200 dpi, the exposure energy is dispersed for the pattern written with the higher resolution of 1200 dpi (a wider region on the photoconductor is exposed). When the same image pattern (the pattern with 200 lpi and an area ratio of 11%) is formed with different resolutions, the exposure energy is dispersed for the pattern with a higher resolution.

As a result, an electrostatic latent image to be formed by the writing process is formed shallow over a wide region. When an electrostatic latent image is formed shallow, a phenomenon, such as deteriorated highlight reproducibility, occurs at a highlighted portion, and deformation becomes quicker at a dark portion due to the same mechanism, thereby lowering the gradation reproducibility.

For an oblique line or the like, so-called jaggies can be reduced by setting the resolution to 1200 dpi. FIG. 21 depicts image data (upper side) corresponding to oblique lines with the same line width and an inclination angle of 45 degrees and exposure regions (lower side) corresponding to the image data.

With the resolution set to 1200 dpi, image data itself can be generated with reduced jaggies of an oblique line (the upper right side in the diagram).

An exposure region on the photoconductor when writing is done for the image data becomes as shown on the lower right side in FIG. 21. While the exposure energy is dispersed and spread in the exposure region as per the previous case of a dot image, it is apparent that the jaggies at the edge portions are reduced. For a character/line image, therefore, increasing the resolution to 1200 dpi from 600 dpi can ensure expression of an image with reduced jaggies.

When the resolution is increased without reducing the beam size, the photoconductor is exposed with the exposure energy dispersed for the reason given above. This may lower reproducibilities including the highlight reproducibility at a highlighted portion and the gradation reproducibility, and may lower the gradation for a picture image or a graphics image, degrading the image quality.

Such a reduction in gradation reproducibility means the generation of a dense region indicating a sharp density change in the relationship between input image data and an image density (so-called γ characteristic). The appearance of such a region indicating a sharp density change means the appearance of discontinuous gradation in an output image, which is a major factor of degrading the image quality.

In color image formation of outputting an image through color correction or gradation correction, a gradation loss occurs in the region indicating a sharp density change at the time of correcting the gradation. This means the degradation of the quality of the image of a pseudo contour or the like.

SUMMARY OF THE INVENTION

It is an object of the present invention to provide an image forming apparatus that reduces jaggies in a character/line image without lowering the gradation of a picture image or a graphics image.

An image forming apparatus according to an aspect of the present invention includes a pseudo half tone processing unit that performs a pseudo half tone process on input image data to generate output image data; a writing unit that executes light modulation of a plurality of light emitting sources based on the output image data and performs writing in such a way that number of light emitting sources be used differ when writing a character/line image and a picture image or a graphics image. The pseudo half tone processing unit performs the pseudo half tone process with different resolutions on a character/line image and a picture image or a graphics image based on the number of the light emitting sources to be used for the writing by the writing unit.

An image forming method according to another aspect of the present invention includes performing a pseudo half tone process on input image data to generate output image data; and executing light modulation of a plurality of light emitting sources based on the output image data; performing writing in such a way that number of light emitting sources be used differ when writing a character/line image and a picture image or a graphics image. The performing a pseudo half tone process includes performing the pseudo half tone process with different resolutions on a character/line image and a picture image or a graphics image based on the number of the light emitting sources to be used for the writing by the writing unit.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 4 is a diagram of the relationship between an image attribute and a pseudo half tone process performed by the image forming apparatus;

FIG. 11 is a schematic explanatory diagram of the outline of a resolution matching process according to a second embodiment of the present invention;

FIG. 13 is a schematic explanatory diagram of the outline of a resolution matching process according to a fourth embodiment of the present invention;

FIG. 14 is an example of an error diffused matrix to be used in a pseudo half tone process according to a fifth embodiment of the present invention;

FIG. 17 is a structural diagram of a color imaging unit of a revolver type that can be adapted to the image forming apparatus according to the present invention;

FIG. 18 is a schematic structural diagram of an imaging unit (printer unit) in a conventional image forming apparatus that uses an electrophotographic process;

FIG. 20 is an explanatory diagram of the correlation between image data with the resolution of a dot image and an exposure region on a photoconductor; and FIG. 21 is an explanatory diagram of the correlation between image data with the resolution of a line image and an exposure region on the photoconductor.

DETAILED DESCRIPTION

Exemplary embodiments of an image forming apparatus and an image forming method according to the present invention will be explained below with reference to the accompanying drawings.

An image forming apparatus and an image forming method according to a first embodiment of the present invention will be described below with reference to FIGS. 1 to 10.

Figure 1:
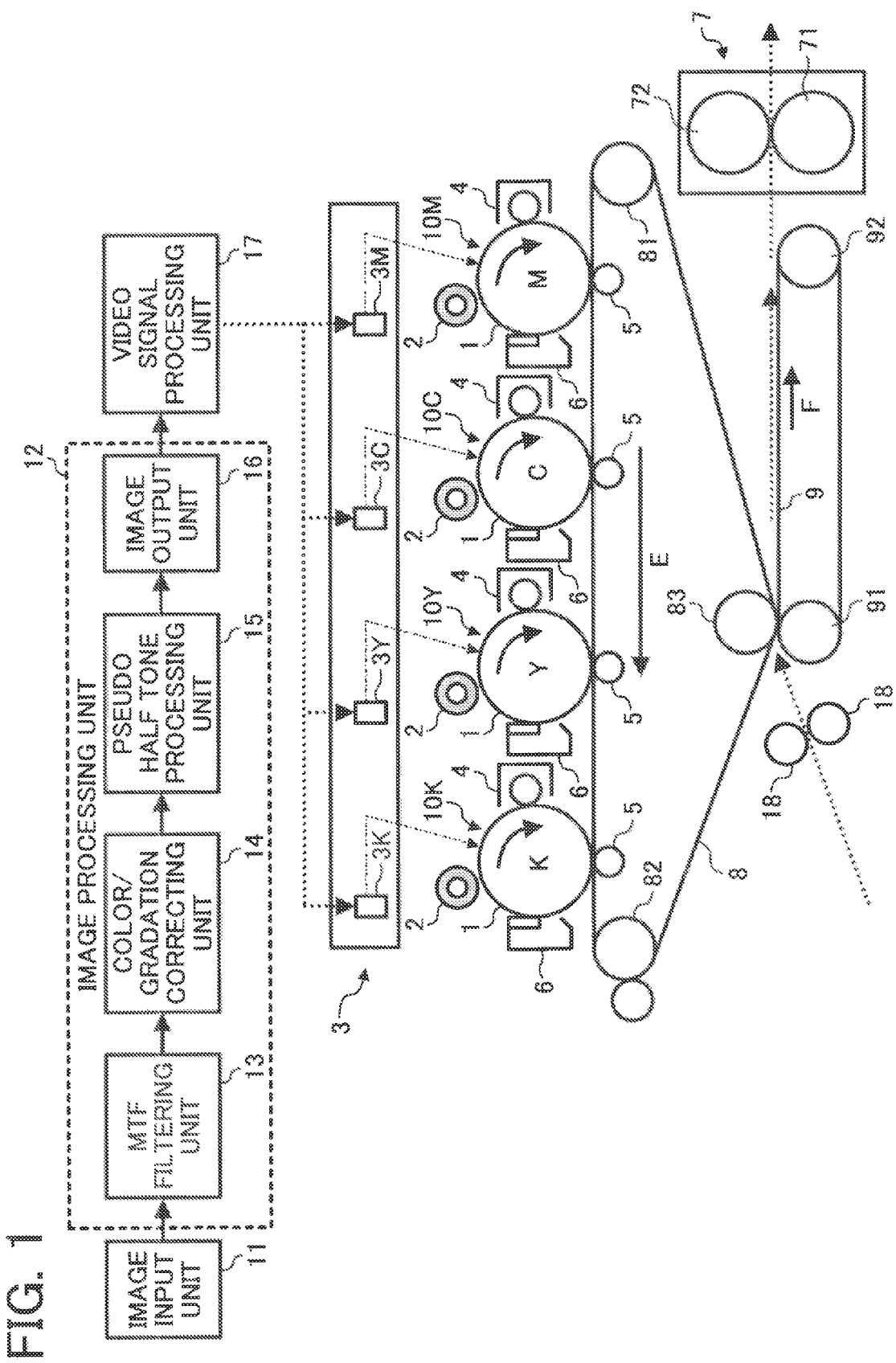
FIG. 1 is a system structural diagram of the schematic general configuration of an image forming apparatus for explaining a first embodiment of the present invention.

FIG. 1 is a system structural diagram of the schematic general configuration of an image forming apparatus. The image forming apparatus is a full-color image forming apparatus that forms an image by placing color-component images of four colors of magenta (M), cyan (C), yellow (Y), and black (K), one on another, on a recording sheet by an image forming unit.

The image forming apparatus therefore has four image forming units 10M, 10C, 10Y, and 10K arranged in an imaging unit from the left side to the right side in FIG. 1 in order in association with the color components of M, C, Y, and K. Images of the color components formed by the respective image forming units 10M, 10C, 10Y, and 10K are sequentially transferred onto an intermediate transfer unit (intermediate transfer belt) 8 arranged in contact with the image forming units. The intermediate transfer unit 8 is stretched over rollers 81 and 82, and a tension roller 83 that serves as a secondary transfer roller and is rotated in the direction of an arrow E at a given timing by a driving unit (not shown).

Images of toners of individual colors (individual color-component images) are overlaid on one another on the intermediate transfer unit 8 at a predetermined position, thus forming a color image. The color-component images overlaid on the intermediate transfer unit 8 are transferred onto a recording sheet at a time to be an image (toner image) on the recording sheet.

Each of the image forming units 10M, 10C, 10Y, and 10K of the individual colors in the imaging unit includes a photosensitive drum 1, a charging roller 2, a developing unit 4, a transfer roller 5, and a cleaning unit 6. The photosensitive drum 1 rotates in the arrow direction. The charging roller 2 charges the photosensitive drum 1 to a desired potential. The developing unit 4 develops an electrostatic latent image, written by scanning the charged top surface of the photosensitive drum 1 by an associated one of laser-beam generating/scanning units 3M, 3C, 3Y, and 3K, with toners of the associated color component. The transfer roller 5 constitutes a primary transfer unit that transfers the toner image on the photosensitive drum 1, developed by the associated developing unit 4, onto the intermediate transfer unit 8. The cleaning unit 6 cleans toners remaining on the photosensitive drum 1 and not transferred to the intermediate transfer unit 8.

A conveying belt 9 is stretched over a roller 91 facing the roller 83, and a roller 92 disposed near a fixing unit 7, and is rotated in the direction of an arrow F.

A dotted line with an arrowhead indicates the moving path of the recording sheet. The recording sheet is fed to the nip portion (secondary transfer position) of the roller 83 and the roller 91 that constitute a secondary transfer unit at a given timing by a pair of resist rollers 18, and is fed in the direction of the arrow F by the conveying belt 9 while the color-component images (toner images of the four color components) overlaid on the intermediate transfer unit 8 are being transferred onto the recording sheet. While the recording sheet passes through the fixing unit 7 later, the recording sheet is heated and pressed at the nip portion of a heating roller 71 and a pressure roller 72 so that the toner images are fixed to be a color print image. The recording sheet is then ejected out of the apparatus.

Video signals for the individual color components of an image to be formed are distributed to the laser-beam generating/scanning units 3M, 3C, 3Y, and 3K of the exposure unit 3 from a video signal processing unit 17, and laser beams generated as a consequence are modulated.

Figure 19:
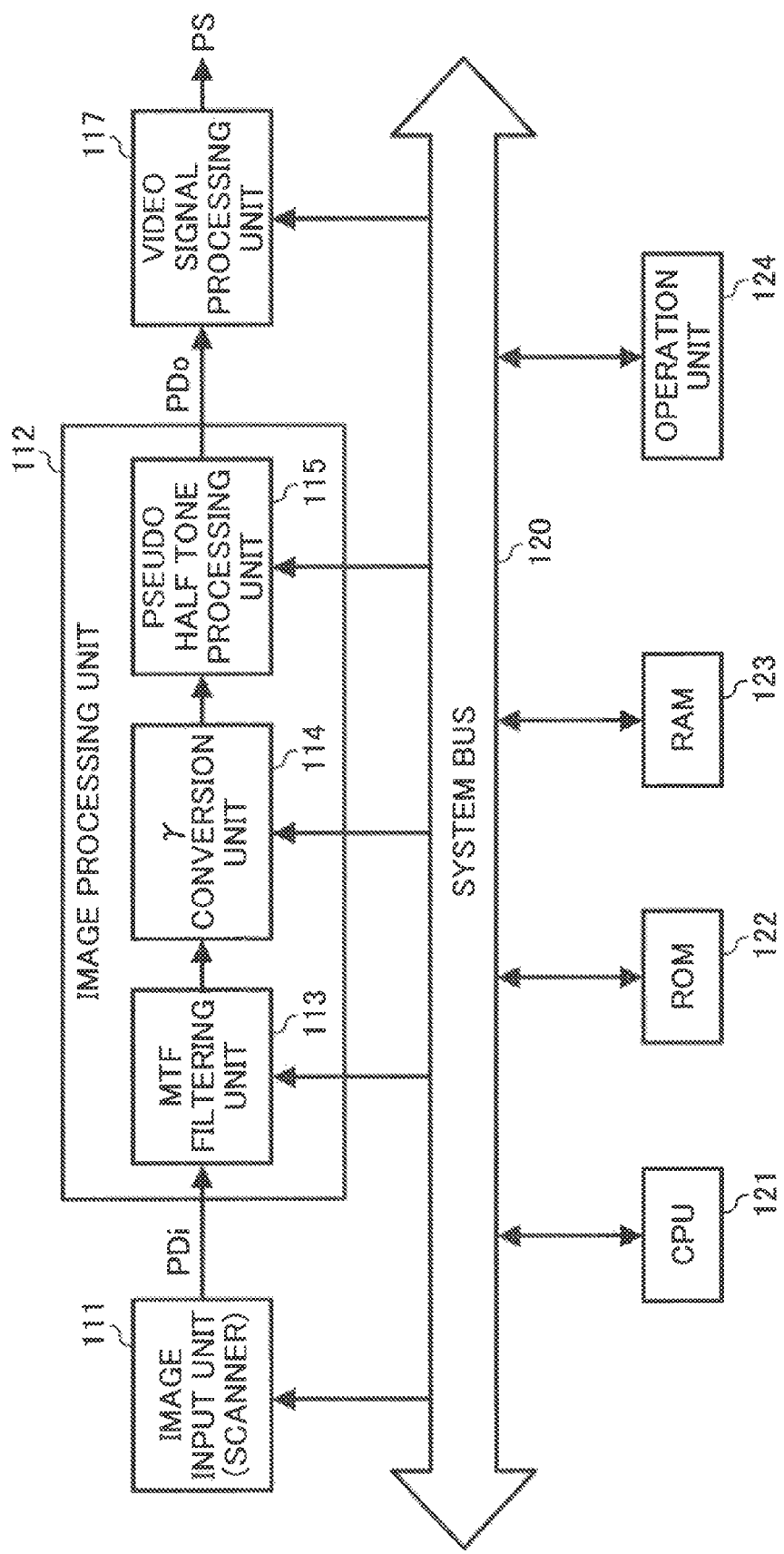
FIG. 19 is a block diagram of an example of the configuration of an image processing unit in the image forming apparatus.

An image input unit 11, an image processing unit 12 and the video signal processing unit 17 for the process are nearly identical to the image input unit 111, the image processing unit 112, and the video signal processing unit 117 of the conventional technology as shown in FIG. 19, except that the image processing unit 12 has an MTF filtering unit 13, a color correcting/gradation correcting unit 14, a pseudo half tone processing unit 15, and an image output unit 16. Units similar to those units including the CPU 121 shown in FIG. 19, which constitute a microcomputer, are likewise provided but not shown.

A description will now be given of those units in the image forming apparatus that are associated with image data processing.

The following schematically describes how input image data is subjected to image processing and signal processing to be a laser drive signal in the exposure unit 3.

Figure 2:
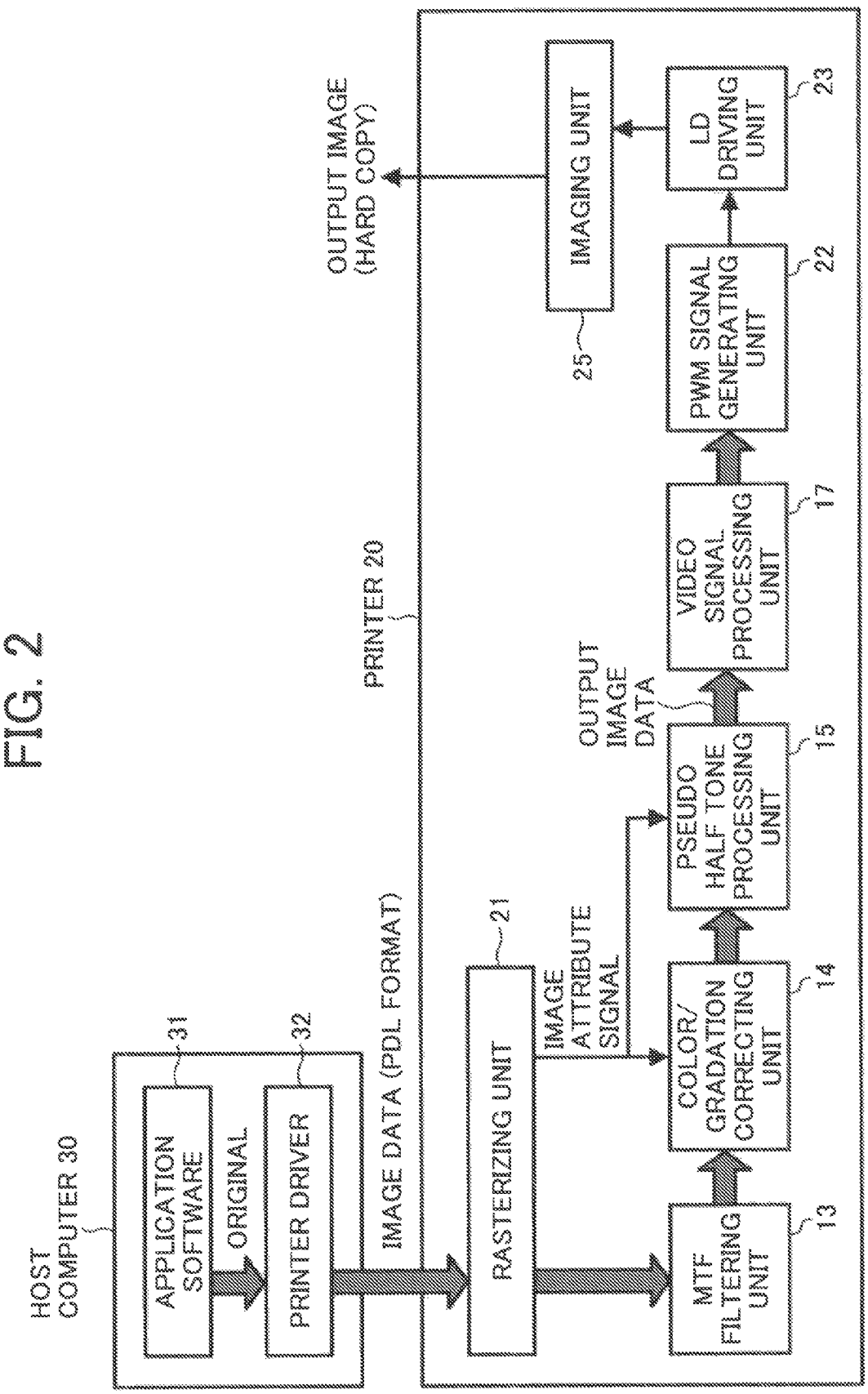
FIG. 2 is a block diagram of the flow of data in the image forming apparatus.

FIG. 2 is a block diagram of the flow of data in the image forming apparatus according to the first embodiment.

The image forming apparatus is a printer 20 that receives image data from a host computer 30 and prints the image data.

The host computer 30 is provided with application software 31 that generates a document and an image, and a printer driver 32 that converts an image formed by the printer 20 (hard copy) in a form interpretable by the printer 20 and transfers the converted image to the printer 20.

An original created by the application software 31 is transferred to the printer driver 32 when image formation (printing) on a recording sheet (paper) becomes necessary.

The printer driver 32 converts the original to, for example, a page description language (PDL). The description by the PDL includes information on an image (object) to be formed actually and attribute information of the object.

Data, which is sent to the printer 20 from the host computer 30, is not limited to data described in the PDL, but may be a raster image scanned by an image reading apparatus (image scanner) or the like and stored in a file.

In the case of a raster image, information indicating the attribute of an each object to be drawn should be sent from the host computer 30 or may be generated by a raster image analysis unit provided instead of a rasterizing unit 21 in the printer 20. In the following description, data to be sent to the printer 20 from the host computer 30 is data written in the PDL as one example. When the image forming apparatus is a digital copying machine, a scanner for scanning an original is added and input data is sent from the scanner.

Processing of image data in the printer 20 shown in FIG. 2 will be described next. Of the individual blocks in the printer 20 shown in FIG. 2, those which correspond to the individual blocks in FIG. 1 are designated like reference signs.

When image data described in the PDL is input as input data to the printer 20, the data is interpreted by the rasterizing unit 21, thus forming a raster image. At this time, for each object, the type, such as a character/line, a picture or a graphics image, and attribute signals, for example, are generated and are output to the MTF filtering unit 13, the color correcting/gradation correcting unit (hereinafter "color/gradation correcting unit") 14, the pseudo half tone processing unit 15, and so forth.

The MTF filtering unit 13 selects the optimal filter for each attribute according to the signal of the attribute sent from the rasterizing unit 21 and performs an enhancement process. As the MTF filtering is the same as that of the conventional technology, its detailed description will be omitted.

Image data undergone MTF filtering is given to the color/gradation correcting unit 14 at the next step.

The color/gradation correcting unit 14 performs color conversion from red, green, and blue (RGB) color space, which is PDL color space input from the host computer 30, to CMYK color space which is color space including colors of color agents (toners) to be used in an imaging unit 25 of the printer engine, and various correction processes, such as gradation correction, are further executed, by using the optimal color correction coefficient for each attribute according to the signal of the attribute sent from the rasterizing unit 21. As the color/gradation correcting process is also the same as that of the conventional technology, its detailed description will be omitted.

After processing done in the color/gradation correcting unit 14, the image data is given to the pseudo half tone processing unit 15. The pseudo half tone processing unit 15 performs a pseudo half tone process to generate output image data. In the embodiment, the pseudo half tone process is performed on data, undergone the color/gradation correcting process, by a dither method. That is, quantization is done by comparing the data with a dither matrix stored beforehand. At this time, the dither matrix set to the optimal number of lines and the optimal screen angle is selected according to the signal of the attribute sent from the rasterizing unit 21 to carry out the optimal pseudo half tone process.

Image data as a result of the image processing is sent as output image data to the video signal processing unit 17 at the next step. The video signal processing unit 17 receives the output image data, stores data for the number of light emitting sources of the exposure unit 3 (shown in FIG. 1) of the image processing section 25 (4-channel laser diode that constitutes the laser-beam generating/scanning units 3M, 3C, 3Y, and 3K in the embodiment) in a line memory, and gives data in the line memory corresponding to the individual pixels to a PWM signal generating unit 22 at a given timing by a pixel clock.

The PWM signal generating unit 22 converts the data to a PWM signal and gives the signal to a LD driving unit 23. The LD driver 23 drives the 4-channel laser diodes (LD devices) of the exposure unit 3 (shown in FIG. 1) in the image processing section 25 through light modulation with a predetermined amount of light according to the PWM signal.

The 4-channel laser diodes are an LD array having a line of four light emitting sources (laser diodes) formed on a single chip, and laser beams from the light emitting sources are made into parallel light by collimator lens, respectively, and are cut to a luminous flux corresponding to the desired beam size by the aperture. In this embodiment, the beam size of the laser beam is set to be 40 (main scanning direction)×40 (sub scanning direction) micrometers on the photoconductor.

The laser beam flux after passing the aperture passes through a cylindrical lens and enters a polygon mirror. The polygon mirror is a rotatable pentahedron mirror that rotates at a rotational speed of 34,724 revolutions per minute (rpm). The laser beam flux that is reflected at the polygon mirror is condensed by a scan lens (f-θ lens), and is reflected at a reflection mirror to form an image on the photosensitive drum 1 shown in FIG. 1.

The components from the laser diode to the collimator lens, the aperture, the polygon mirror, the scan lens, and the reflection mirror are shown as the laser-beam generating/scanning unit 3M, 3C, 3Y, or 3K channel by channel.

The image processing section 25 (including the exposure unit 3, the image forming units 10M, 10C, 10Y, and 10K, the intermediate transfer unit (intermediate transfer belt) 8, the conveying belt 9, and the fixing unit 7 shown in FIG. 1) can form a desired image of a recording sheet such as paper in this manner.

Figure 3:
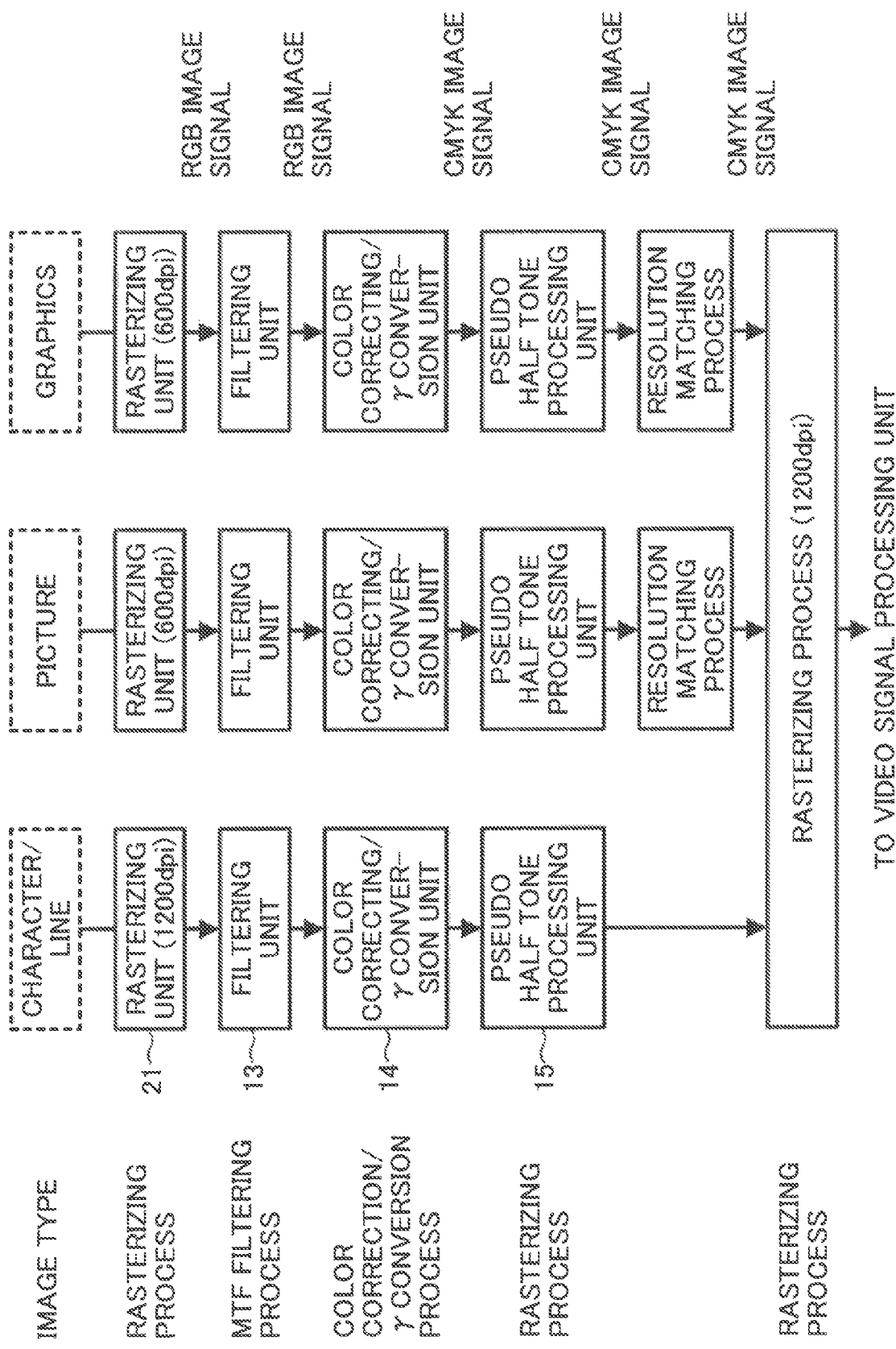
FIG. 3 is an explanatory diagram of the flow of image data in an image processing unit in the image forming apparatus.

A detailed description will now be given of the flow of image data for each type of an image in individual image processing steps carried out by the image forming apparatus according to the first embodiment. FIG. 3 is an explanatory diagram of the flow of image data in the image processing unit.

While image data in a PDL format or the like is rasterized in the first embodiment, information of the image attribute is not lost at this point of time.

For image data whose image attribute is "picture", after the rasterizing unit 21 rasterizes the image data with the resolution of 600 dpi, the MTF filtering unit 13 performs the optimal MTF filtering process for the picture attribute, and the color/gradation correcting unit (color correction/γ conversion unit) 14 performs color correction and gradation correction, the pseudo half tone processing unit 15 performs the optimal pseudo half tone process for the picture attribute. This embodiment employs a dither process that uses a combination of the number of lines and the screen angle and the quantization number shown in the middle row in FIG. 4 for the individual colors C, M, Y, and K.

For image data whose image attribute is "character/line", after the rasterizing unit 21 rasterizes the image data with the resolution of 1200 dpi, the MTF filtering unit 13 performs the optimal MTF filtering process for the character/line attribute, and the color/gradation correcting unit (color correction/γ conversion unit) 14 performs color correction and gradation correction, the pseudo half tone processing unit 15 performs the optimal pseudo half tone process for the character/line attribute. This embodiment employs a dither process for a character/line image, i.e., a dither process that uses a combination of the number of lines and the screen angle and the quantization number shown in the upper row in FIG. 4.

For image data whose image attribute is "graphics", after the rasterizing unit 21 rasterizes the image data with the resolution of 600 dpi as in the case of a picture image, the MTF filtering unit 13 performs the optimal MTF filtering process for the graphics attribute, and the color/gradation correcting unit (color correction/γ conversion unit) 14 performs color correction and gradation correction, the pseudo half tone processing unit 15 performs the optimal pseudo half tone process for the graphics attribute. The embodiment employs a dither process that uses a combination of the number of lines and the screen angle and the quantization number shown in the lower row in FIG. 4 for the individual colors C, M, Y, and K.

For a picture image and a graphics image, after the associated dither processes are executed in the above manner, the resolution matching process is performed.

The resolution matching process will be described with reference to FIG. 5. In the first embodiment, image data that is to be given to the video signal processing unit 17 at last is raster data with the resolution of 1200 dpi. Because the resolution is 600 dpi until the pseudo half tone process for a picture image and a graphics image, it is necessary to change the resolution to match with 1200 dpi. This requires the resolution matching process.

In the first embodiment, for a picture image, the number of light emitting sources (laser diodes) that performs writing is set to a half the number of light emitting sources for a character/line image as will be described later. Specifically, two laser diodes are used for a picture image while four laser diodes are used for a character/line image. For a picture image, therefore, data values corresponding to the amount of light for the picture image should be matched for rasterized data of 1200 dpi so that the laser diodes emit lights with at least twice as great as the amount of light for a character/line image.

The step of converting the data value to one corresponding to the predetermined amount of light of the laser diode for a picture image and generating output image raster data with the resolution of 1200 dpi is called the resolution matching process. While the resolution matching process in the first embodiment is performed for a picture image and a graphics image, the scheme for the resolution matching process hardly differs for both image types. Therefore, the resolution matching process will be described only for a picture image in the following description of the resolution matching process.

The image data that is given to the video signal processing unit 17 is 6-bit data with the resolution of 1200 dpi, and the upper two bits in six bits are used for data of a character/line image after the pseudo half tone process. For a picture image, the lower four bits are used for data (the resolution being still 600 dpi) after the pseudo half tone process.

For a picture image, as the resolution is 600 dpi before the resolution matching process, data that does not cause laser emission is set for three pixels around a pixel of interest at the time of forming a raster image of 1200 dpi.

Figure 5:
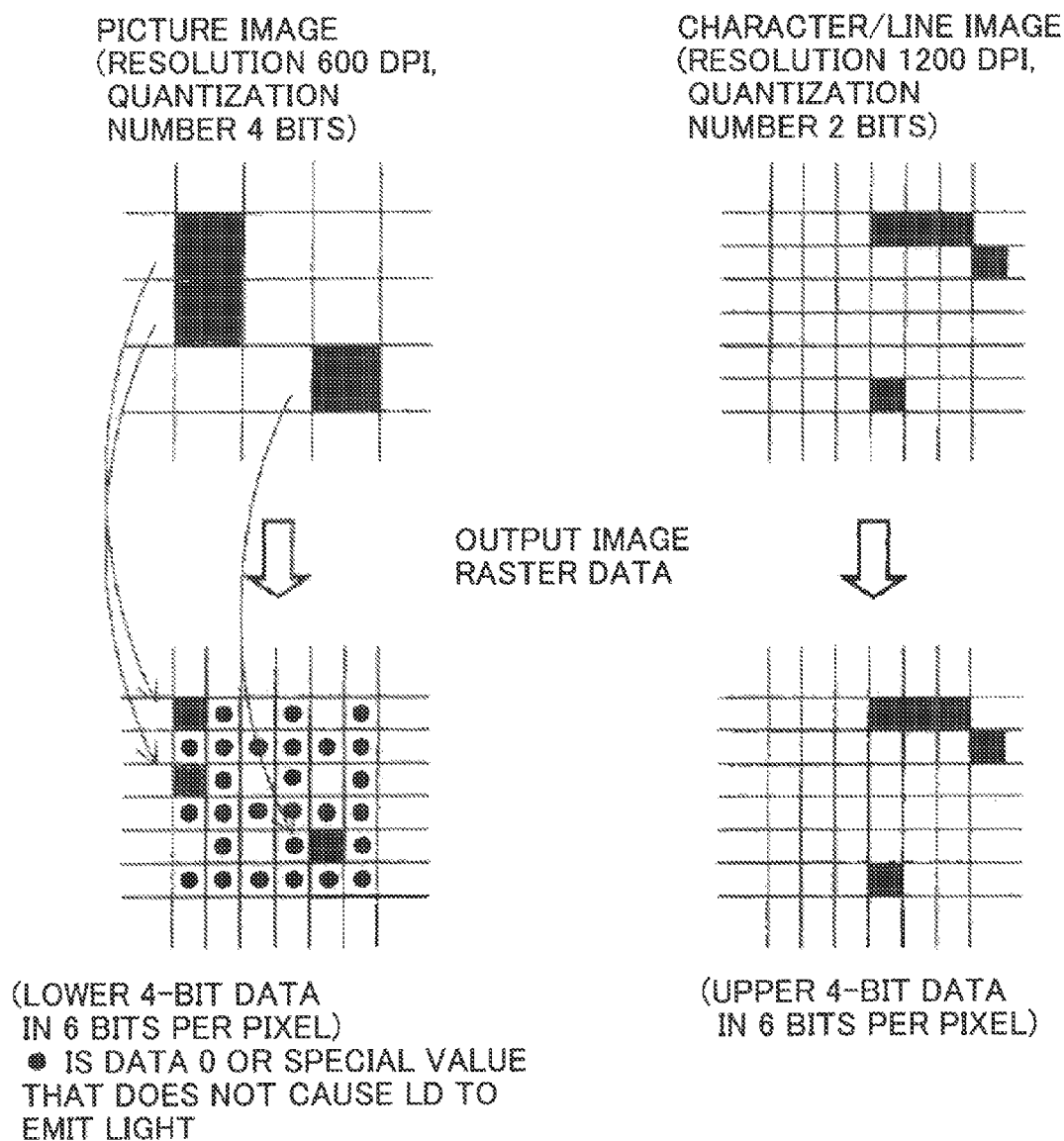
FIG. 5 is a schematic explanatory diagram of the outline of a resolution matching process in FIG. 3.

As shown in FIG. 5, the resolution matching process matches the value of image data (picture image) of 600 dpi after the pseudo half tone process for one of four pixels of 1200 dpi, and puts no value or puts a special value (indicated by black dots) that does not cause emission of the laser diode for the other three pixels.

In this embodiment, it is assumed that a character/line image, a picture image, and a graphics image are formed on the same sheet. That is, image data is such that one part on the same recording sheet is a character image and the remaining portion is a picture image and a graphics image. Also, characters may be placed on a picture image. A PDL file of such a format may be input in some case. To cope with such images, 6-bit data is formed in such a way that a valid data value is placed at either the upper two bits (for a character/line image) or the lower four bits (for a picture or a graphics image) in the six bits of the output image data.

The resolution matching process carries out such an operation. When PDL data that forms a line/character image on a picture image, for example, a portion where line/character data is written is overwritten so that the value is set to 0 (invalid) even when data of the lower four bits (for a picture or a graphics image) corresponding to that portion is set.

The image processing unit finally generates a 6-bit raster image even with the resolution of 1200 dpi in the above manner and provides the video signal processing unit 17 shown in FIG. 2 with the raster image. The video signal processing unit 17 receives the 6-bit output image data of 1200 dpi, performs data conversion of the output image data by referring to a prestored look-up table (LUT), and then gives the resultant data to the PWM signal generating unit 22.

Figure 6:
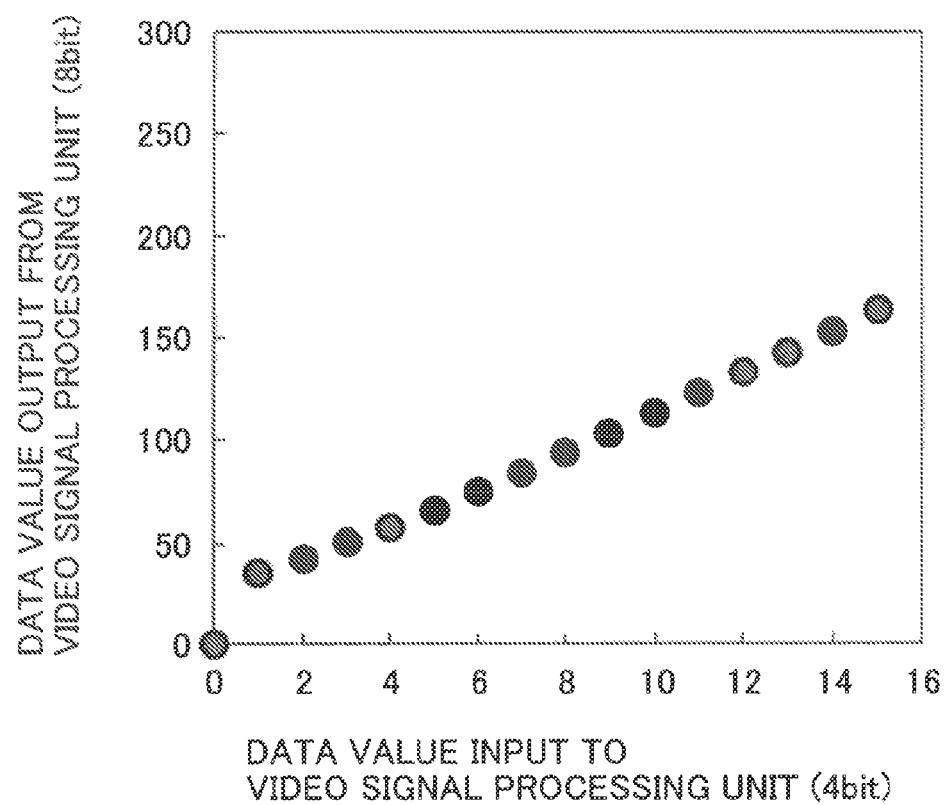
FIG. 6 is a conversion table for a picture image according to the first embodiment.

To allow the PWM signal generating unit 22 to execute PWM control with the resolution of 8 bits, the video signal processing unit 17 determines that the image data is a picture image if there is a value at the lower four bits in the 6-bit data of the output image data (no value being at the upper two bits then for the reason given above), and performs bit allocation to the PWM 8 bits according to the conversion rules for a picture image. FIG. 6 is a conversion table for a picture image according to the first embodiment.

As the image data is a picture image at this time, LDs to be used are only two of the four LDs (specifically, LDs with even numbers). In other words, in the signal processing in the video signal processing unit 17 no PWM signal is supplied to those LDs that become unnecessary at the time of writing a picture image.

Figure 8:
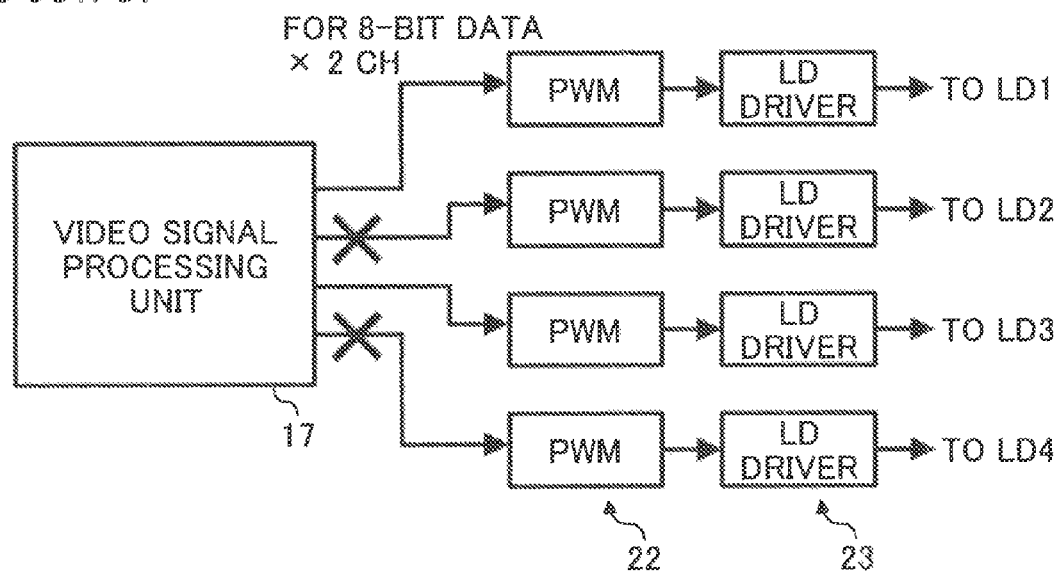
FIG. 8 is an explanatory diagram of the flow of data from the video signal processing unit to the LD driving unit through the PWM signal generating unit at the time a picture image and a graphics image are output.

FIG. 8 depicts the flow of data from the video signal processing unit 17 to the PWM signal generating unit (abbreviated as "PWM" in FIG. 6) 22. As described above, for a picture image, the resolution matching process is executed after the pseudo half tone process is finished in this embodiment. At this time, data "0" (invalid) is set for three pixels around a pixel of interest, so that when data is supplied to the PWM signal generating unit 22 from the video signal processing unit 17, the LD does not actually emit light for the pixels that contains the data "0".

Although either the scheme of placing data "0" at the time of executing the resolution matching process or the scheme of determining whether data having a proper value is picture image data in the video signal processing and inhibiting the supply of data to unnecessary LDs can be employed as the scheme of reducing the number of LDs to be used in writing for a picture image, both schemes are taken in this embodiment.

Figure 7:
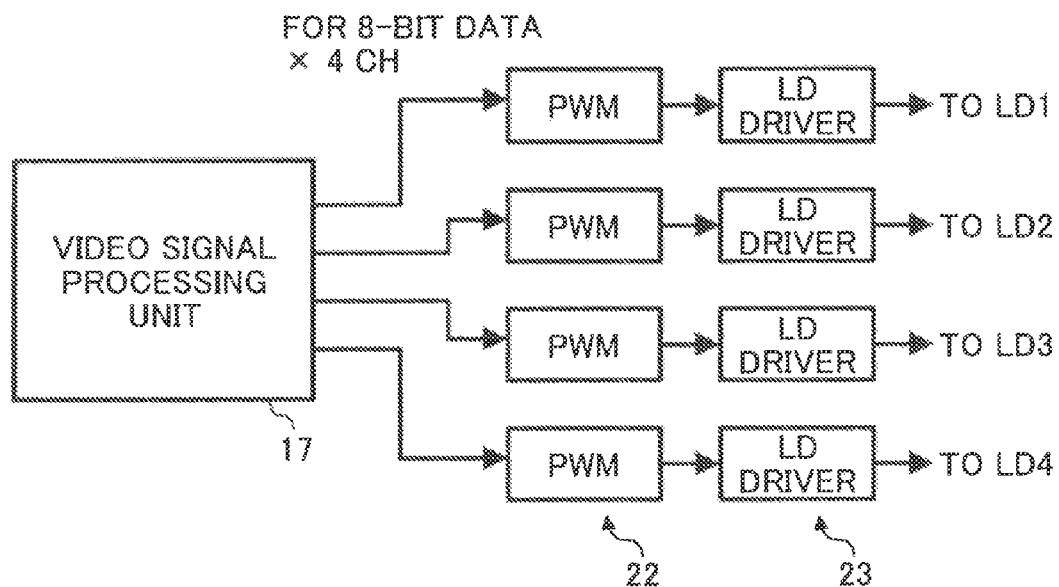
FIG. 7 is an explanatory diagram of the flow of data from a video signal processing unit to an LD driving unit through a pulse width modulation (PWM) signal generating unit at the time a character/line image is output.
Figure 9:
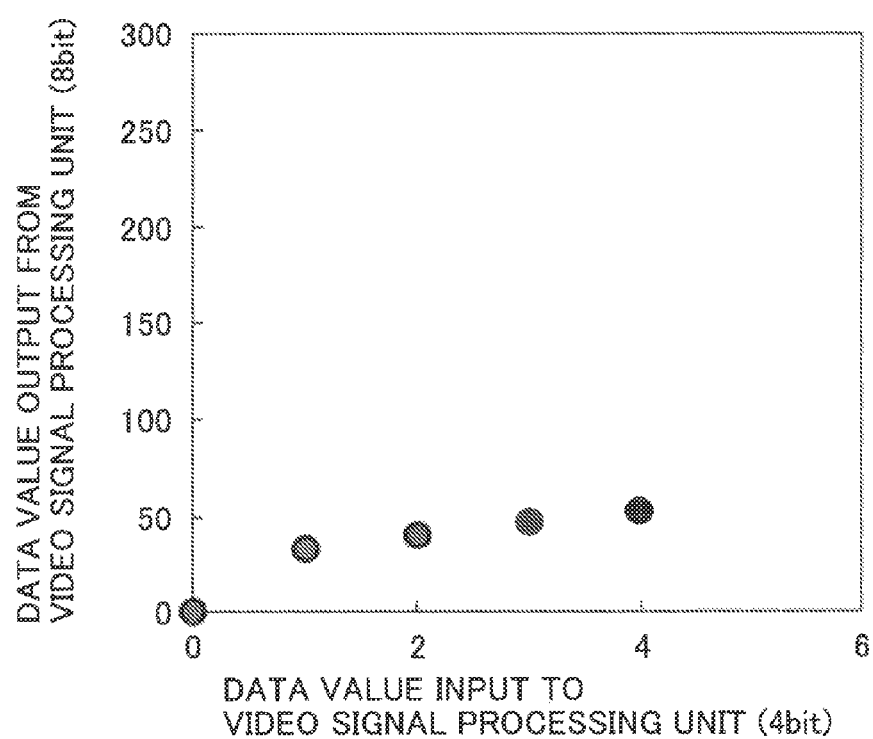
FIG. 9 is a diagram of a conversion table at the time of forming a character/line image.

When image data is a character/line image, as shown in FIG. 7, PWM data is supplied to all of the four LD driving units ("LD drivers" in FIG. 6) 23 so that all of the four LDs emit lights. When image data is a character/line image, there are data values only at the upper two bits of each pixel of the 6-bit raster data of 1200 dpi, so that the video signal processing unit 17 reads the data values and allocates the values to the PWM 8 bits according to the conversion rules for a character/line image by referring the conversion table for the character/line image (for writing data of 1200 dpi). FIG. 9 is the conversion table at the time of forming a character/line image.

The PWM signal generating unit 22 generates a PWM signal (an analog pulse width modulation signal) from the 8-bit data received and sends the PWM signal to the LD driving unit 23. Upon reception of the PWM signal, the LD driving unit 23 drives the LDs through light modulation in such a way as to control light emission of the LDs according to the signal. The LD driving unit 23 also has a function of preventing the amount of light emission of the LDs from being influenced by a change in temperature caused by the heat generated by the LDs (APC: Auto Power Control) and a function of ensuring fast light modulation (application of the excitation current). As the configuration following the LD driving unit 23 and its operation are the same as those of an image forming apparatus like the conventional printer, the detailed descriptions will be omitted.

Figure 10:
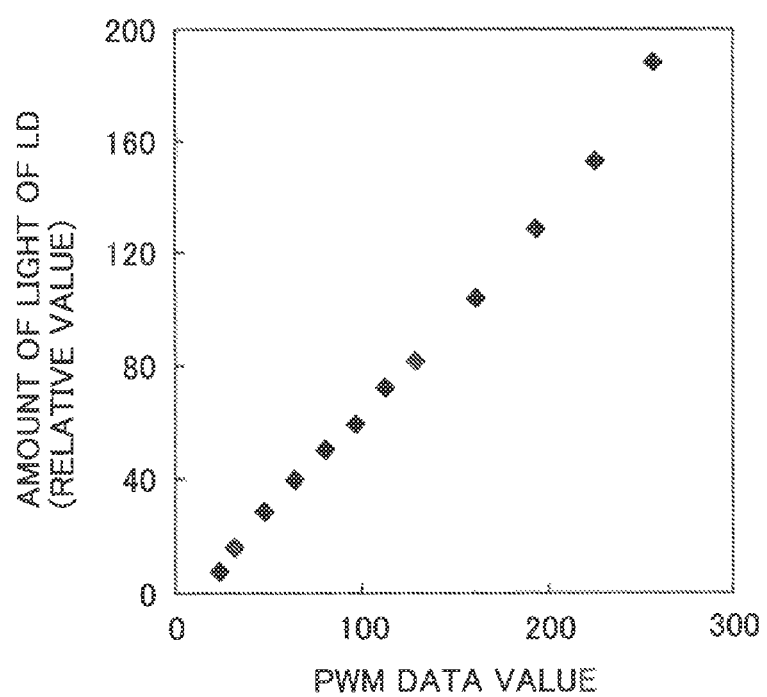
FIG. 10 is a diagram of the relationship between a data value to be given to the PWM signal generating unit and the amount of light emission of an LD.
Figure 12:
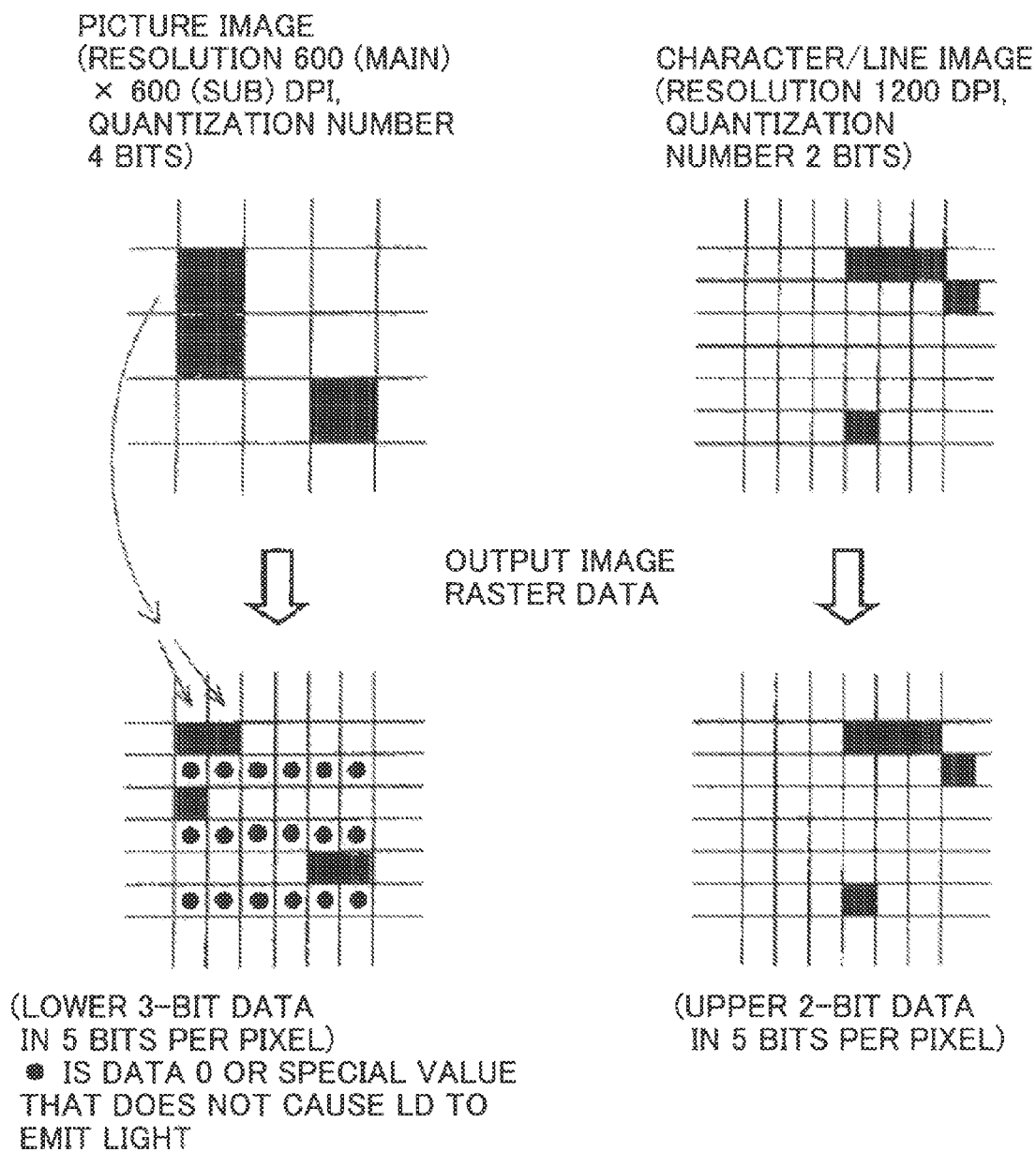
FIG. 12 is a schematic explanatory diagram of the outline of a resolution matching process according to a third embodiment of the present invention.

FIG. 10 is a diagram of the relationship between a data value (8 bits) to be given to the PWM signal generating unit and the amount of light emission of the LD at that time in this embodiment.

Corresponding FIG. 6 to FIG. 9 and FIG. 10, the amount of light of the LD per pixel for a picture image or a graphics image is set about five times the amount of light of the LD for a character/line image. This is because the optimal amounts of light are respectively set for a character/line image and a picture image or a graphics image due to the difference between the image forming condition for a picture image and the image forming condition for a character/line image, i.e. due to the difference between the numbers of LD to be used. The non-linear behavior of the light attenuation characteristic of the photoconductor is also a factor for making such different settings.

The specification of the look-up table (LUT) for each image type is determined from the optimal writing condition (the amount of light of the LD) through image output experiments conducted at the development phase of the apparatus, and the determined values are stored in the memory of the image forming apparatus beforehand.

The operation can ensure a pseudo half tone process and writing with the resolution of 1200 dpi for a character/line image and a pseudo half tone process and writing with the resolution of 600 dpi for a picture image and a graphics image in the embodiment. Further, even when both a character/line image and a picture/graphics image are on the same sheet, such a pseudo half tone process and writing can be carried out.

The following results were obtained through an experiment of forming an image by the image forming apparatus and the image forming method according to the first embodiment of the present invention and forming an image for the comparative purpose under the condition that the pseudo half tone process for a "picture image" in the first embodiment was performed with the resolution of 1200 dpi and four LDs were used in writing (the condition is hereinafter referred to as "Comparative Example 1").

The pseudo half tone process employed the dither method and used dither matrixes having the same number of lines and the same angle as those shown in FIG. 4 and generated with the resolution of 600 dpi (4-bit pixel) and the resolution of 1200 dpi (2-bit pixel). For writing with the resolution of 1200 dpi (using all of the four LDs) in Comparative Example 1, the best PWM value setting table (LUT) under the condition was determined through experiments conducted beforehand and images were output using the LUT.

First, with regard to jaggies, the output images provided by the first embodiment and Comparative Example 1 had no difference for a "character/line image". The result is expected because the first embodiment and Comparative Example 1 had quite the same condition for a "character/line image".

For a "picture image", 32-stage patches of the colors C, M, Y, and K were output and the reflection densities of the colors C, M, Y, and K were measured. The results showed an approximately linear γ curve in the first embodiment and an S-shaped γ curve indicating poor reproducibility at a highlighted portion and fast deformation at a dark portion for Comparative Example 1.

Further, images were outputs through gradation correction performed to acquire the target γ characteristic from the results of the 32-stage patch image outputs under the condition of the first embodiment and the condition for Comparative Example 1. The results of outputting an SCID_NI chart as a typical example of the image output results will be explained.

The results of outputting images after executing gradation correction showed that even the face portion of a person could be expressed seamlessly (without unnaturalness) from a bright part to a dark one in the first embodiment. With regard to the gradation reproducibility, the image could bear comparison with the image (sample) output by offset printing. By way of comparison, an image likewise output through gradation correction under the condition for Comparative Example 1 showed an apparent gap (pseudo contour) between colors at the face portion of a person and showed unnaturalness.

A second embodiment of the present invention will be explained next. The configuration of an image forming apparatus according to the second embodiment is identical in almost all of the components as that of the first embodiment. The difference of both embodiments lies in the pseudo half tone process and the resolution matching process. In the second embodiment, unlike in the first embodiment, the pseudo half tone process is carried out with the resolution of 1200 dpi in the main scanning direction and with the resolution of 600 dpi in the sub scanning direction for a picture image or a graphics image, so that data is written substantially with the resolution of 1200 dpi in the main scanning direction and with the resolution of 600 dpi in the sub scanning direction. The LDs are used in writing in the same way as done in the first embodiment, so that two of the four LDs are used in writing.

In the second embodiment, a pseudo half tone process is executed with the resolution of 1200 dpi (main scanning direction)×600 dpi (sub scanning direction) and the quantization number of three bits.

Output raster image data is generated as 5-bit data with the resolution of 1200 dpi as shown in FIG. 11. The 5-bit data in one pixel contains upper two bits for a "character/line image" and lower three bits for a "picture image" or a "graphics image".

In the second embodiment, the quantization number in the pseudo half tone process for a "picture image" is decided to be three bits because the results of the experiment conducted beforehand while changing the quantization number indicates that for the resolution of the embodiment (1200 dpi (main)×600 (sub) dpi), if the quantization number is equal to or greater than three bits, a texture cannot be sensed when the pseudo half tone process is performed.

A third embodiment of the present invention will be explained next. The configuration of an image forming apparatus according to the third embodiment is also identical in almost all of the components as that of the first embodiment. The difference of both embodiments lies in the resolution matching process. In the third embodiment, like the first embodiment, the pseudo half tone process is executed with the resolution of 600 and the quantization number of four bits per pixel.

In the resolution matching process, unlike in the process in the first embodiment, one pixel (still 600 dpi at this stage) of data after the pseudo half tone process is allocated to two pixels (1200 dpi) of output raster image data. That is, 4-bit data per pixel is converted to two pixels of data consisting of three bits per pixel in the allocation. The image processing unit in the image forming apparatus according to the third embodiment is capable of executing such a resolution matching process.

The configuration can make the amount of light of an LD corresponding to one pixel of output image raster data smaller than that of the first embodiment. In other words, the amount of light that should be achieved by the amount of light for one pixel in the first embodiment can be achieved by the amount of light for two pixels in the third embodiment, so that the maximum amount of light emitted from the LD can be set to about a half in the third embodiment. Because the maximum amount of light emitted from the LD is reflected on the cost for an LD device, the third embodiment can permit low-cost LD devices to be mounted in an image forming apparatus, thereby realizing a low-cost image forming apparatus.

In the third embodiment, as apparent from comparison with the first embodiment, the same amount of output image raster data as that in the first embodiment can be achieved with 5 bits per pixel (6 bits per pixel in the first embodiment). The pseudo half tone process when executed with the resolution of 600 dpi and the quantization number of four bits has no data loss in both the first embodiment and the third embodiment. Therefore, the third embodiment can realize an image forming apparatus that is advantageous in the data transfer rate and the data storage capacity.

A fourth embodiment of the present invention will be explained next. One feature of the fourth embodiment lies in that the exposure unit uses a light emitting diode (LED) array for the light source. The LED optical system has the following merits over the LD raster system of the first embodiment.

(1) Reduction in noise due to no driving unit such as a polygon mirror.

(2) Reduction in space because the size of optical unit itself can be small.

The LED optical system also significantly differs from the LD raster system in that for the portion associated with the present invention, writing on the photoconductor with emitted light is done in the so-called sub scanning direction (the rotational direction of the photosensitive drum or the peripheral direction of the drum).

In the fourth embodiment, the scan direction of emitted light is in the scan direction in the second embodiment rotated by 90 degrees. In the fourth embodiment, for a "picture image", the pseudo half tone process is executed with the resolution of 600 dpi (main scanning direction)×1200 dpi (sub scanning direction) and the quantization number of three bits. Writing is done substantially with the resolution of 600 dpi in the main scanning direction×1200 dpi in the sub scanning direction. As the writing is done with the LED array, the writing is executed with the resolution reduced substantially to 600 dpi by turning on every other LED in the LED array.

As shown in FIG. 13, data that has undergone the pseudo half tone process in the above-described manner, represents how output image raster data is generated through the micrometers. In the fourth embodiment, the scan direction in the second embodiment (FIG. 11) is rotated by 90 degrees. As the fourth embodiment is functionally identical as the second embodiment, the detailed description will be omitted.

A fifth embodiment of the present invention will be explained next. The configuration of an image forming apparatus according to the fifth embodiment is identical in almost all of the components as that of the first embodiment. The fifth embodiment differs from the first embodiment in that the pseudo half tone process in the first embodiment employs the dither method according to the image attribute shown in FIG. 4, whereas the fifth embodiment employs an error diffusion method.

In the fifth embodiment, the pseudo half tone process employs the error diffusion method using an error diffusion matrix shown in FIG. 14. As the detailed contents (specific process contents) of the error diffusion method are the same as those of the conventional technology, the detailed description will be omitted. In the embodiment, the error diffusion process is executed with the resolution of 1200 dpi and the quantization number of 1 bit for a "character/line image". For a "picture image" and a "graphics image", the error diffusion process is executed with the resolution of 600 dpi and the quantization number of 1 bit.

Further, for a "picture image" and a "graphics image", after the error diffusion process is executed with the resolution of 600 dpi, the resolution matching process is carried out to generate 2-bit output image raster data with the resolution of 1200 dpi. The 2-bit data per pixel consists of the upper one bit for a "character/line image" and the lower one bit for a "picture image" and a "graphics image".

An example of another imaging unit that can be adapted to the image forming apparatus according to the present invention will be described below.

Figure 16:
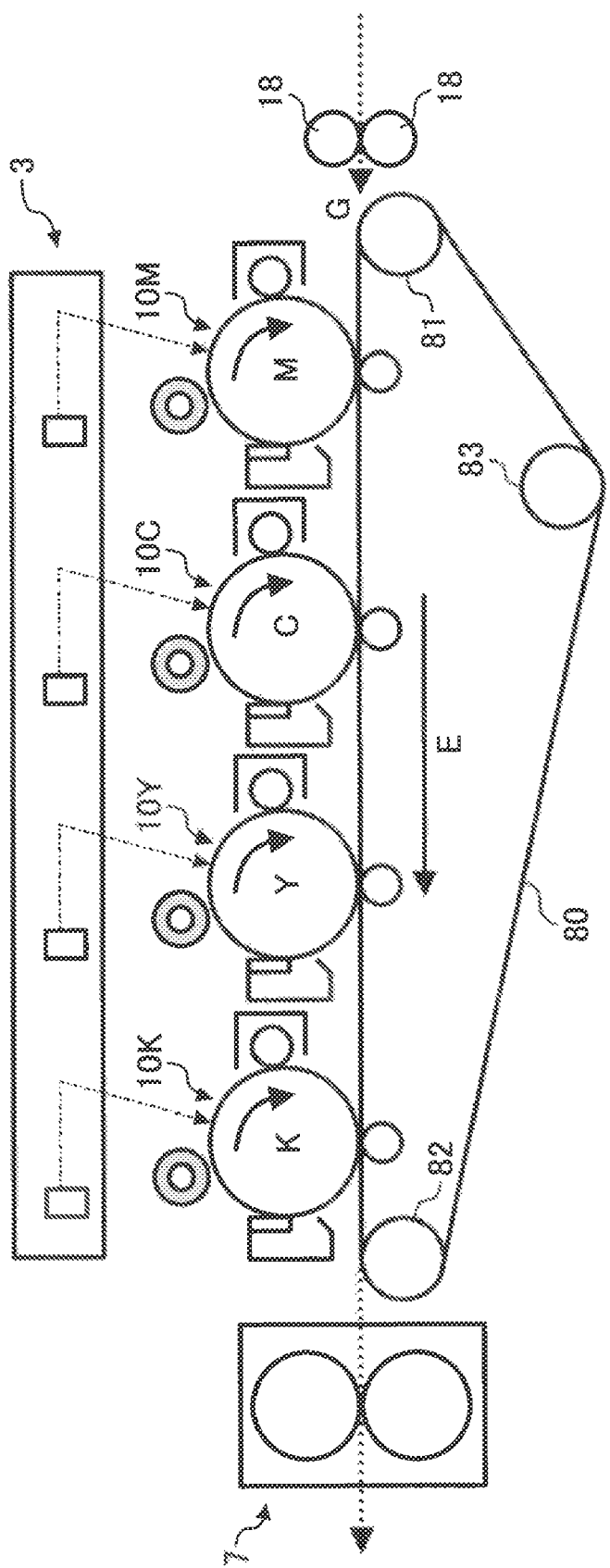
FIG. 16 is a structural diagram of a color imaging unit of a tandem type that can be adapted to the image forming apparatus according to the present invention.

FIG. 16 is a structural diagram of a color imaging unit of a tandem type (direct transfer type), and those components that are similar to the corresponding components in FIG. 1 are designated by like reference signs to avoid a redundant description. The imaging unit differs in configuration from the imaging unit of the first embodiment in that the conveying belt 9 and the rollers 91 and 92 are omitted, the tension roller 83 simply serves as a tension roller, and a conveying belt 80 is stretched over the rollers 81, 82, and 83 in place of the intermediate transfer unit 8. Further, the position of the resist roller pair 18 and the position of the fixing unit 7 are interchanged from one to the other.

The individual toner images of magenta, cyan, yellow, and black formed on the top surfaces of the photosensitive drums 1 by the respective image forming units 10M, 10C, 10Y, and 10K of the individual colors are directly and sequentially transferred in an overlaid manner onto a recording sheet that is fed onto the conveying belt 80 as indicated by a dotted arrow G by the resist roller pair 18 and is then fed in the direction of an arrow E. As the recording sheet passes the fixing unit 7, the transferred toner images are fixed to be a color print image that is in turn ejected out of the apparatus.

The image forming apparatus equipped with such a color imaging unit of the tandem type (direct transfer type) can also be provided with image processing capabilities similar to those of each of the first to the fifth embodiments and can execute the associated image forming method.

FIG. 17 is a structural diagram of an example of a color imaging unit of a revolver type. The imaging unit has a set of a photosensitive drum 41, a charging roller 42, a transfer roller 45, a cleaning unit 46, a revolver developing unit 44, which has developers of the four colors M, C, Y, and K provided in a rotatable and switchable manner, a sheet feeding drum 48 and a fixing unit 47.

By sequentially switching the developers in the revolver developing unit 44 to be used, toner images of the individual colors formed on the receiving unit 41 are transferred in an overlaid manner onto the sheet feeding drum 48. The transferred images are transferred onto the recording sheet that is fed from the direction of an arrow H and are fixed by the fixing unit 47. The images-fixed recording sheet is then ejected.

The image forming apparatus equipped with such a color 20, imaging unit of the revolver type can also be provided with image processing capabilities similar to those of each of the first to the fifth embodiments and can execute the associated image forming method.

Operation and Advantages According to each Individual Aspects of the Invention will be explained now.

The image forming apparatus and the image forming method have a characteristic that writing is done in such a way that those of the light emitting sources (laser diodes or LEDs) in the exposure unit be used differ in quantity between a "character/line image" and a "picture image" or a "graphics image", and a pseudo half tone process is executed with the resolution that differs among a "character/line image" and a "picture image" or a "graphics image" corresponding to the number of the light emitting sources to be used.

The configuration can generate image data with a high resolution for a character/line image and can eliminate unsmooth portions of a character or an oblique line, such as jaggies. This makes it possible to provide such an expression that the differences between individual fonts can be discriminated even on an image (hard copy image) on a recording sheet such as paper.

For a picture image or a graphics image, image formation with an excellent gradation reproducibility can be accomplished. That is, the reproducibility at a highlighted portion gets higher, and deformation at a dark portion can be prevented, thus inhibiting a drastic density change from occurring.

The reason why the advantage is obtained is that execution of writing with a high resolution without reducing the beam size inhibits the exposure region becoming wider, that would otherwise cause an electrostatic latent image to be formed wide and shallow.

As a result, image formation that does not generate an abnormal image, such as a sharp change (discontinuity of gradation), in an output image can be realized while achieving the advantage of reducing jaggies caused by the high resolution. In a full-color image forming apparatus that executes color/gradation correction before outputting an image, a sharp change in gradation causes an outstanding gradation loss at the portion where the sharp gradation change occurs, generating a pseudo contour that results in significant degradation of the image quality. Because the present invention does not cause a sharp gradation change, it does not generate a pseudo contour that is a factor of causing such degradation of the image quality.

The image forming apparatus and the image forming method have a characteristic in that writing is performed by executing light modulation of a plurality of light emitting sources based on the output image data and scanning light emitted from each of the light emitting sources in the main scanning direction, and when the pseudo half tone process is performed, the resolution in the sub scanning direction is made different between a "character/line image" and a "picture image" or a "graphics image" corresponding to the quantity of the light emitting sources to be used in writing.

A multi-beam optical system that performs writing of an LD raster system forms an electrostatic latent image by executing writing by scanning with a laser beam in the so-called main scanning direction (the direction perpendicular to the rotational direction of the photosensitive drum).

With regard to the example shown in FIG. 20, it has been explained that for a "picture image", reducing the resolution (to a half) in both the main scanning direction and the sub scanning direction can prevent the exposure region from becoming wider that would otherwise cause an electrostatic latent image to be formed wide and shallow, thus ensuring image formation with an excellent gradation reproducibility.

The same mechanism can prevent spreading of the exposure region in the sub scanning direction even when only the resolution in the sub scanning direction is reduced (to a half, for example), so that image formation with higher excellent gradation reproducibility can be realized as compared with the case that the resolution in the sub scanning direction is not reduced.

Figure 15:
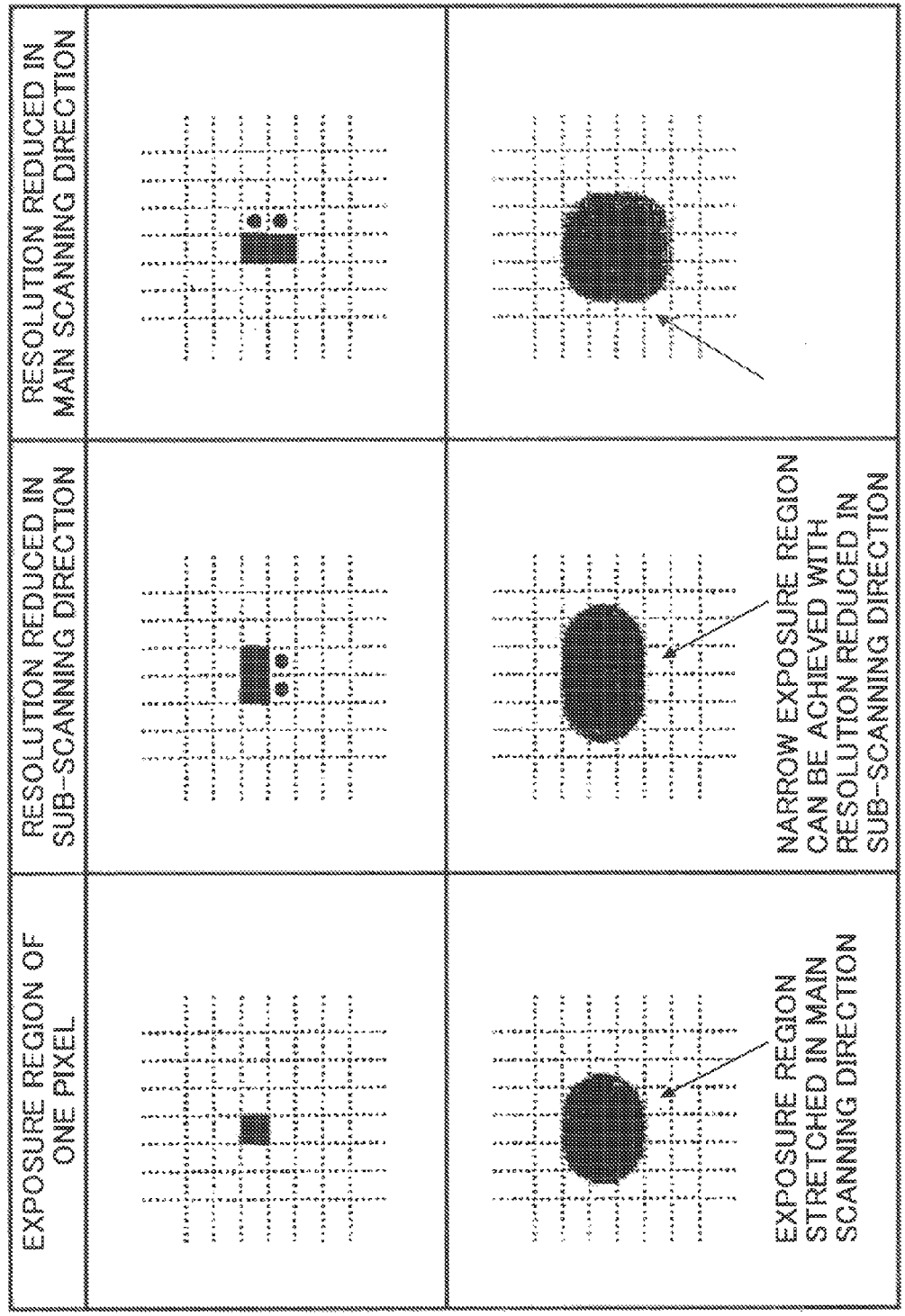
FIG. 15 is a comparison diagram for explaining that reducing the resolution in the sub scanning direction according to the second embodiment of the present invention can realize a narrow exposure region.

Further, writing of the LD raster system is executed and scanning with a laser beam in the main scanning direction is executed to write data. As the beam position moves in the main scanning direction while the LD is lit, therefore, the exposure region formed by the laser beam becomes elongated in the main scanning direction. In such a case, it is advantageous to reduce the resolution in the sub scanning direction rather than reducing the resolution in the main scanning direction from the viewpoint of making the exposure region smaller, as has been explained earlier with reference to FIG. 15. Accordingly, the image forming apparatus and the image forming method can efficiently reduce the exposure region formed by a laser beam.

The resolution in the main scanning direction is not made lower (the resolution in the main scanning direction remains at 1200 dpi). This can make it possible to make the amount of light per pixel smaller than that in the other aspects. As the maximum amount of light emission (rated value) of the LD is directly associated with the cost of an LD device in use, the use of an LD device with a smaller maximum amount of light emission can permit the use of a low-cost LD device. This makes it possible to realize a low-cost image forming apparatus excellent in gradation reproducibility.

The image forming apparatus and the image forming method have a characteristic in that, writing is performed by executing light modulation of a plurality of light emitting sources based on the output image data and scanning light emitted from each of the light emitting sources in the sub scanning direction, and when the pseudo half tone process is performed, the resolution in the main scanning direction is made different between a "character/line image" and a "picture image" or a "graphics image" corresponding to the quantity of the light emitting sources to be used in writing.

This case can also be considered as advantageous if the resolution in the main scanning direction rather than reducing the resolution in the sub scanning direction from the viewpoint of making the exposure region smaller, with the same concept in the foregoing description of the advantage of the image forming apparatus in the other aspects. In this case, an exposure region equivalent to one pixel takes a shape that is long longitudinally or long in the sub scanning direction.

Accordingly, image formation with an excellent gradation reproducibility can be realized by efficiently reducing the exposure region as in the previous case.

The image forming apparatus and the image forming method have a characteristic that in each image forming apparatus or its associated image forming method described above, the pseudo half tone process is executed with fewer light emitting sources to be used and a lower resolution for a "picture image" or a "graphics image" than for a "character/line image".

As mentioned earlier, image data to be input is classified into three types: "character/line image", "picture image", and "graphics image". A "character/line image" has such a characteristic that the shape reproducibility of a character or a line is important while the color reproducibility and the gradation reproducibility are considered less important. By way of contrast, a "picture image" or a "graphics image" has the opposite characteristic such that the color reproducibility and the gradation reproducibility are considered more important than the shape reproducibility.

According to the present invention, because a pseudo half tone process with a high resolution and writing with a high resolution are achieved for a "character/line image", jaggies or the like are not generated and a high shape reproducibility can be ensured. As a pseudo half tone process with a low resolution and writing with a low resolution are achieved for a "picture image" or a "graphics image", the exposure region can be made smaller, thus ensuring a high gradation reproducibility.

The image forming apparatus and the image forming method have a characteristic that in each image forming apparatus or its associated image forming method described above, even when a "character/line image" and a "picture image" or a "graphics image" are on the same recording surface (on the same sheet) as input data, writing is executed in such a way that the number of those in plural light emitting sources be used is changed between the "character/line image" and the "picture image" or the "graphics image" and the pseudo half tone process is executed in such a way that the resolution for the "character/line image" differs from the resolution for the "picture image" or the "graphics image" according to the number of the light emitting sources.

Even for such a mixed image, therefore, the adequate combination of the pseudo half tone process and the number of light emitting sources to be used is selected for each image type as done in each image forming apparatus or its associated image forming method described above, so that a "character/line image" portion, a "picture image" portion and a "graphics image" portion can be output respectively with the highest image qualities for the portions.

The image forming apparatus and the image forming method have a characteristic in that, the pseudo half tone process executed with the resolution of 1200 dpi for a "character/line image", and with the resolution of 600 dpi for a "picture image" or a "graphics image".

To make various types of fonts identifiable for a "character/line image", it is possible to achieve the resolution of 1200 dpi that is required. For a "picture image" or a "graphics image", the resolution of 600 dpi required at the time of executing the dither process that is the pseudo half tone process from the viewpoint of a flexibility of the screen angle and the number of screen lines (to prevent a color moire from being generated by the screen angle given, the CMYK dither matrix requires the resolution of 600 dpi).

The image forming apparatus and the image forming method have a characteristic in that, writing is execute in such a way as to satisfy the relationship of Ds>L where L is a length per pixel based on the resolution of a "character/line image" and Ds is a beam spot size in the sub scanning direction in writing.

When the beam spot size meets the condition, an exposure region on the photoconductor to be exposed by a laser beam can be made smaller by reducing the number of light emitting sources to be used for a "picture image" or a "graphics image". When the beam spot size is small (Ds<L), on the other hand, an exposure region on the photoconductor to be exposed by a laser beam cannot be made smaller and nothing is changed if the number of light emitting sources to be used is changed.

However, making the beam spot size smaller requires a larger optical system and the use of lenses with larger diameters, leading to a cost increase, as explained in the Description of the Related Art. When the beam spot size cannot be reduced (when a small optical system and a low-cost optical system is used), the present invention can achieve both the shape reproducibility for a "character/line image" and the gradation reproducibility for a "picture image" or a "graphics image".

The image forming apparatus and the image forming method have a characteristic in that, writing is execute in such a way as to satisfy the relationship of Dm>L where L is a length per pixel based on the resolution of a "character/line image" and Dm is a beam spot size in the main scanning direction in writing.

Even when the beam spot size cannot be reduced (when a small optical system and a low-cost optical system is used or when an LED optical system that scans on the photoconductor in the sub scanning direction), the present invention can achieve both the shape reproducibility for a "character/line image" and the gradation reproducibility for a "picture image" or a "graphics image" for the same reason given above.

The image forming apparatus and the image forming method have a characteristic that in each image forming apparatus or its associated image forming method described above, light-modulation driving of the light emitting sources modulates the amount of light emission per pixel with multi-values.

This light-modulation driving can set the amount of light per pixel to different values between a "character/line image" and a "picture image" or a "graphics image" even when writing is executed in such a way that the number of light emitting sources to be used is changed according to the image type. Further, the setting of the amount of light can be done without changing the LD driving hardware (e.g., changing the current to be applied to the LD by adjusting a variable resistor).

Therefore, the present invention can set the amount of light per pixel to the desired amount for each image type by changing the data value alone while taking the same hardware configuration for a "character/line image" and a "picture image" or a "graphics image".

The image forming apparatus and the image forming method have a characteristic that in each image forming apparatus or its associated image forming method described above, output image data and the light-modulation driving status of the LD are associated with each other according to the conversion rule that differs between a "character/line image" and a "picture image" or a "graphics image".

As has been already described, the resolution at the time of executing the pseudo half tone process a "character/line image" differs from the resolution at the time of executing the pseudo half tone process for a "picture image" or a "graphics image". It has already been described that the difference in image type leads to a difference in image quality. Because of those differences, the desirable output image data and light-modulation driving status of the LD differ between a "character/line image" and a "picture image" or a "graphics image".

With the situation taken into consideration, the present invention takes such a configuration as to associate output image data and the light-modulation driving status of the LD with each other according to the conversion rule that differs between a "character/line image" and a "picture image" or a "graphics image". Accordingly, the association can be adjusted to put a weight on the shape reproducibility for a "character/line image" and can be adjusted to put a weight on the gradation reproducibility for a "picture image" or a "graphics image". This can more efficiently ensure the high image quality that differs image type by image type.

The image forming apparatus and the image forming method have a characteristic that in each image forming apparatus or its associated image forming method described above, the light emitting sources to be used in writing are formed with a laser diode array having a plurality of LDs arranged on a single chip.

The use of an optical unit for the LD array that has plural LDs as light emitting sources arranged on a single chip can make the image forming apparatus compact. That is, the use of the LD array can allow an emission unit having plural light emitting sources to be retained in the space having the same size as an ordinary optical unit that has a single light emitting source.

This feature does not therefore raise a problem of enlarging the image forming apparatus according to the present invention that has plural light emitting sources and can thus realize a compact image forming apparatus.

The image forming apparatus and the image forming method have a characteristic that in each image forming apparatus or its associated image forming method described above, the pseudo half tone process that is performed on a "character/line image" and the pseudo half tone process that is performed on for a "picture image" or a "graphics image" both employ the error diffusion method but with different resolutions.

According to the present invention, the pseudo half tone process is the error diffusion method, making it possible to output an image with an excellent density reproducibility (the average density is saved and a moire, for example, is hard to occur).

Changing the resolution in error diffusion between a "character/line image" and a "picture image" or a "graphics image" brings about the following advantage.

According to the error diffusion method, while the density of original data is saved particularly at a highlighted portion to reproduce the density properly, the interval between dots is too long so that shape information is lost. For a "character/line image" that requires shape information, therefore, the error diffusion method with a high resolution is used to reproduce the shape information well. That is, increasing the resolution increases the number of dots so that shape information is reproduced without being lost. By way of comparison, a "picture image" or a "graphics image" requires a gradation reproducibility so that the resolution of 600 dpi or the like is sufficient, and using the error diffusion method with a high resolution (1200 dpi), if used, however, provides a sharp γ characteristic, so that the output image would contain much noise, such as banding, and become unstable.

In this respect, the present invention employs the error diffusion method with a high resolution for a "character/line image" to keep the shape reproducibility well and employs the error diffusion method with a low resolution (writing being done with an exposure region concentrated and made small) for a "picture image" or a "graphics image" to keep the gradation reproducibility well.

The image forming apparatus and the image forming method have a characteristic that in each image forming apparatus or its associated image forming method described above, the pseudo half tone process to be performed on a "character/line image" is the error diffusion method, and the pseudo half tone process to be performed on for a "picture image" or a "graphics image" is the dither method.

From the same concept as given above, the use of the high-resolution error diffusion method for a "character/line image" can maintain a good shape reproducibility, and the use of the dither method for a "picture image" or a "graphics image" can reproduce the gradation with excellent granulation. Because an exposure region formed by a laser beam can be made smaller by substantially lowering the resolution for a "picture image" or a "graphics image", image formation with an excellent gradation reproducibility can be accomplished.

The image forming apparatus and the image forming method have a characteristic that in each image forming apparatus or its associated image forming method described above, the pseudo half tone process to be performed on a "character/line image", and the pseudo half tone process to be performed on for a "picture image" or a "graphics image" are both the dither method.

According to the present invention, the use of the dither method with a low resolution (600 dpi) for a "picture image" or a "graphics image" can concentrate an exposure region formed by a laser beam and make the region smaller, thus providing an image with an excellent gradation reproducibility and a good granulation. In addition, the dither method makes the load on the pseudo half tone process lighter (lighter computation load) as compared with the error diffusion method, thus making it possible to achieve a fast pseudo half tone process.

According to the present invention, by increasing the resolution of the dither method in the pseudo half tone process to be performed on for a "character/line image", a factor of deteriorating the shape reproducibility of a "character/line image" due to the shape of the dither matrix can be eliminated, making it possible to keep the shape reproducibility adequately. As the resolution increases, the load on the pseudo half tone process (becomes greater (an increase in processing time). Therefore, the use of the dither method that puts a relatively lighter load on the pseudo half tone process can achieve a fast pseudo half tone process.

The image forming apparatus and the image forming method have a characteristic that the image forming apparatus or the image forming method described above, the pseudo half tone process to be performed on a "character/line image" differs from the pseudo half tone process to be performed on for a "picture image" or a "graphics image" in the number of lines.

The dither method as a method for the pseudo half tone process displays the gradation taking a plurality of pixels as a single unit (basic matrix) at the time of forming images of the same area ratio (the same image density). There is an issue in the dither method of taking the size of the basic matrix (the number of pixels that constitute the basic matrix) large or small. The number of pixels is expressed as the number of lines in the dither method. That is, a small number of lines means a large basic matrix, and is equivalent to the state in which a portion where writing is to be done is concentrated when images of the same area ratio are reproduced. A large number of lines means a small basic matrix, and is equivalent to the state in which the number of portions where writing is to be done becomes larger.

In the dither method, the optimal number of lines differs image type by image type. The optimal number of lines for each image type varies depending on the performance of the printer engine portion. The performance of the printer engine portion is determined by the average volume grain size, the thickness of the photoconductor, the τ characteristic of the developer and so forth. When the number of light emitting sources to be used differs according to the image type as in the present invention, the difference in performance becomes more noticeable. It is therefore necessary to determine and set the most adequate number of lines for each printer engine.

As the number of lines in dithering is changed and set image type by image type in the present invention, an image with the highest image quality can be output.

The image forming apparatus and the image forming method have a characteristic that in each image forming apparatus or its associated image forming method described above, the pseudo half tone process is executed after gradation conversion (γ conversion) is performed on input data.

It has been explained above that the present invention provides a good reproducibility at a highlighted portion and reduces deformation at a dark portion, thus reducing a portion where there is a sharp density change, so that a good gradation reproducibility can be realized.

As has been described in the foregoing description of the first embodiment, the gradation correction (γ conversion) function is not affected by the characteristic of the printer engine portion and keeps the reflection density of input data and an output image constant. As the function has been described in the foregoing description of the first embodiment, its detailed description will be omitted. The gradation correction can permit the reflection density to be matched with the target density in some extent even in the case of the printer engine characteristic where, for example, the density changes drastically.

When gradation correction is applied to a printer engine that shows such a sharp density change, however, gradation loss occurs. The gradation loss occurs for the following reason. Because of the printer engine characteristic indicating a sharp density change, even when a gradual density change should be added, data equivalent to that density is not acquired (for the data does not take an 8-bit integer value and includes a decimal point). Therefore, a gentle gradation change should be realized only by repetition of a portion where there is no density difference and a portion where a sharp density change occurs.

The natural gradation change is lost at the portion where there is no density change, and is thus called "gradation loss". The occurrence of such gradation loss causes a problem that the output image contains an abnormal image that has a pseudo contour produced.

According to the present invention, a printer engine that does not generate a sharp density change and shows a good gradation reproducibility is realized by executing the pseudo half tone process after gradation conversion (γ conversion) is performed on input data. Even when an image is output after performing gradation correction on input data, therefore, the gradation loss does not occur. This can realize an image forming apparatus that does not generate a pseudo contour that would be originated from gradation loss.

The image forming apparatus and the image forming method have a characteristic that in each image forming apparatus or its associated image forming method described above, a full-color image can be output by placing toner images of the individual colors of C, M, Y, and K on an image carrying unit, such as paper, one on another.

A full-color image has an extremely narrow allowance for a pseudo contour as compared with a monochromatic image. This is because for a color image, a picture image or the like is the intended output image, and also image data that requires accurate reproduction of highlighting of colors C, M, Y, and K increases.

However, the present invention does not cause a pseudo contour even at the time of outputting a full-color image.

The image forming apparatus and the image forming method have a characteristic that in the image forming apparatus or the image forming method described above, the pseudo half tone process is executed after color correction is performed on input data.

The color correction performs conversion of multi-value data (8 to 12 bits) to multi-value data as done in gradation correction. While gradation correction performs one-dimensional conversion of converting the γ curve of each of CMYK data, color correction performs multi-order conversion of generating CMYK data from RBG data.

It is apparent that when the printer engine characteristic causes a sharp density change, color correction cannot be executed with a sufficient accuracy in the color correcting process, so that an intended color turns to be a different color with, for example, a different hue. In addition, a gap between colors, such as a pseudo contour, that should not exist, occurs.

According to the present invention, the characteristic of the printer engine portion does not show a sharp density change, so that a full-color image without the gap between colors can be formed.

For a character/line image, image data with a high resolution can be generated and unsmooth portions, such as jaggies, of a character or an oblique line can be eliminated. This can ensure expression that permits the differences between individual fonts from being discriminated even in an image on a recording sheet such as paper (a hard-copy image). For a picture image or a graphics image, the gradation is not degraded even when the resolution is increased, thus ensuring formation of an image with an excellent gradation reproducibility.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image forming apparatus, comprising:
   a pseudo half tone processing unit that performs a pseudo half tone process on input image data to generate output image data; and
   a writing unit that performs writing by executing light modulation of a plurality of light emitting sources based on the output image data, wherein
   the writing unit performs writing with fewer light emitting sources among the plurality of light emitting sources for a picture image or a graphics image than for a character/line image, and by scanning an emitting light from each of the fewer light emitting sources in a main scanning direction in such a way as to satisfy a relationship of Ds>L, where L is a length per pixel based on a resolution of the character/line image and Ds is a beam spot size in a sub scanning direction in writing, and
   the pseudo half tone processing unit performs the pseudo half tone process with a lower resolution in the sub scanning direction for the picture image or the graphics image than for the character/line image, based on the number of the light emitting sources to be used for the writing by the writing unit.

2. The image forming apparatus according to claim 1, wherein the pseudo half tone processing unit generates output image data by performing a pseudo half tone process on input image data that has a mixture of data of the character/line image and data of the picture image or the graphics image with respect to a same recording surface, and the writing unit performs the writing by executing light modulation of a plurality of light emitting sources based on the output image data, thereby forming an image having a mixture of the character/line image and the picture image or the graphics image on the same recording surface.

3. The image forming apparatus according to claim 1, wherein the pseudo half tone processing unit performs a pseudo half tone process with a resolution of 1200 dpi for the character/line image, and performs a pseudo half tone process with a resolution of 600 dpi for the picture image or the graphics image.

4. The image forming apparatus according to claim 1, wherein the writing unit is configured to modulate an amount of light emission per pixel with multivalues in order to execute light modulation of the light emitting sources.

5. The image forming apparatus according to claim 1, wherein the writing unit associates output image data with a light modulation status of a light emitting source according to a conversion rule that differs between the character/line image and the picture image or the graphics image.

6. The image forming apparatus according to claim 1, wherein the light emitting sources are laser diodes that are arranged in a form of an array on a single chip.

7. The image forming apparatus according to claim 1, wherein the pseudo half tone processing unit performs an error-diffusion-based pseudo half tone process on both data of a character/line image and data of a picture image or a graphics image.

8. The image forming apparatus according to claim 1, wherein the pseudo half tone processing unit performs an error-diffusion-based pseudo half tone process on data of a character/line image, and performs a dither-based pseudo half tone process on data of a picture image or a graphics image.

9. The image forming apparatus according to claim 1, wherein the pseudo half tone processing unit is configured to perform a dither-based pseudo half tone process on both data of the character/line image and data of the picture image or the graphics image.

10. The image forming apparatus according to claim 9, wherein the pseudo half tone processing unit is configured to change a number of lines between a pseudo half tone process on data of the character/line image and a pseudo half tone process on data of the picture image or the graphics image.

11. The image forming apparatus according to claim 1, further comprising a gradation converting unit configured to perform gradation conversion on input image data before the pseudo half tone processing unit performs a pseudo half tone process.

12. The image forming apparatus according to claim 1, further comprising a color image forming unit configured to form a color image by superimposing toner images obtained by developing an image, written by the writing unit, with toners of individual color components of cyan (C), magenta (M), yellow (Y), and black (K), on an image carrying unit.

13. The image forming apparatus according to claim 12, further comprising a color correcting unit that performs color correction on input image data before the pseudo half tone processing unit performs a pseudo half tone process.

14. An image forming method, comprising:
performing a pseudo half tone process on input image data to generate output image data; and
performing writing by executing light modulation of a plurality of light emitting sources based on the output image data, wherein the performing step includes performing writing with fewer light emitting sources among the plurality of light emitting sources for a picture image or a graphics image than for a character/line image, and scanning an emitting light from each of the fewer light emitting sources in a main scanning direction in such a way as to satisfy a relationship of Ds>L, where L is a length per pixel based on a resolution of the character/line image and Ds is a beam spot size in a sub scanning direction in writing, and the step of performing the pseudo half tone process includes performing the pseudo half tone process with a lower resolution in the sub scanning direction for the picture image or the graphics image than for the character/line image, based on the number of the light emitting sources to be used for the writing by the writing unit.

15. The image forming method according to claim 14, wherein the performing a pseudo half tone process includes generating output image data by performing a pseudo half tone process on input image data that has a mixture of data of the character/line image and data of the picture image or the graphics image with respect to a same recording surface, and the performing writing includes performing writing by executing light modulation of a plurality of light emitting sources based on the output image data, thereby forming an image having a mixture of the character/line image and the picture image or the graphics image on the same recording surface.

16. The image forming method according to claim 14, wherein the performing a pseudo half tone process includes performing the pseudo half tone process with a resolution of 1200 dpi for the character/line image, and performs a pseudo half tone process with a resolution of 600 dpi for the picture image or the graphics image.

17. The image forming method according to claim 14, wherein the performing writing includes modulating an amount of light emission per pixel with multivalues in order to execute light modulation of the light emitting sources.

18. The image forming method according to claim 14, wherein the performing writing includes associating output image data with a light modulation status of a light emitting source according to a conversion rule that differs between the character/line image and the picture image or the graphics image.

19. The image forming method according to claim 14, wherein the light emitting sources are laser diodes that are arranged in a form of an array on a single chip.

20. The image forming method according to claim 14, wherein the performing a pseudo half tone process includes performing an error-diffusion-based pseudo half tone process on both data of a character/line image and data of a picture image or a graphics image.

21. The image forming method according to claim 14, wherein the performing a pseudo half tone process includes performing an error-diffusion-based pseudo half tone process on data of a character/line image, and performs a dither-based pseudo half tone process on data of a picture image or a graphics image.

22. The image forming method according to claim 14, wherein the performing a pseudo half tone process includes performing a dither-based pseudo half tone process on both data of the character/line image and data of the picture image or the graphics image.

23. The image forming method according to claim 22, wherein the performing a pseudo half tone process includes changing number of lines between a pseudo half tone process on data of the character/line image and a pseudo half tone process on data of the picture image or the graphics image.

24. The image forming method according to claim 14, wherein the performing a pseudo half tone process is executed after gradation conversion is performed on input image data.

25. The image forming method according to claim 14, further comprising forming a colored image by superimposing toner images obtained by developing an image, written in the step of performing writing, with toners of individual color components of cyan (C), magenta (M), yellow (Y), and black (K), on an image carrying unit.

26. The image forming method according to claim 14, wherein the step of performing writing includes setting an amount of light per light emitting source for the number of light emitting sources used when writing the character/line image to be less than an amount of light per light emitting source for the number of light emitting sources used when writing the picture image or the graphics image.

27. An image forming apparatus, comprising:
- a pseudo half tone processing unit that performs a pseudo half tone process on input image data to generate output image data;
- a writing unit that performs writing by executing light modulation of a plurality of light emitting sources based on the output image data, wherein the writing unit performs writing with fewer light emitting sources among the plurality of light emitting sources for a picture image or a graphics image than for a character/line image, and by scanning an emitting light from each of the fewer light emitting sources in a sub scanning direction in such a way as to satisfy a relationship of Dm>L where L is a length per pixel based on a resolution of the character/line image and Dm is a beam spot size in a main scanning direction in writing; and the pseudo half tone processing unit performs the pseudo half tone process with a lower resolution in the main scanning direction for the picture image or the graphics image than for the character/line image, based on the number of the light emitting sources to be used for the writing by the writing unit.

* * * * *